United States Patent
Ohsawa

(10) Patent No.: US 8,651,161 B2
(45) Date of Patent: Feb. 18, 2014

(54) SHEET-FED OFFSET PRINTING PRESS

(75) Inventor: Shin Ohsawa, Tsukuba (JP)

(73) Assignee: Komori Corporation, Tokyo (JP)

(*) Notice: Subject to any disclaimer, the term of this patent is extended or adjusted under 35 U.S.C. 154(b) by 305 days.

(21) Appl. No.: 12/673,910

(22) PCT Filed: Aug. 28, 2008

(86) PCT No.: PCT/JP2008/065391
§ 371 (c)(1),
(2), (4) Date: Jan. 11, 2011

(87) PCT Pub. No.: WO2009/028599
PCT Pub. Date: Mar. 5, 2009

(65) Prior Publication Data
US 2011/0094684 A1  Apr. 28, 2011

(30) Foreign Application Priority Data
Aug. 31, 2007  (JP) ................. 2007-225099

(51) Int. Cl.
B29C 65/48 (2006.01)
B32B 37/18 (2006.01)
B32B 37/22 (2006.01)
B32B 38/04 (2006.01)
B32B 38/10 (2006.01)
B32B 39/00 (2006.01)
B32B 43/00 (2006.01)

(52) U.S. Cl.
USPC ............................ 156/387; 156/510

(58) Field of Classification Search
USPC .................. 156/277, 384, 387, 388, 510
See application file for complete search history.

(56) References Cited

U.S. PATENT DOCUMENTS

| 4,502,678 A | 3/1985 | Marass |
| 4,736,941 A | 4/1988 | Petersen |
| 5,686,169 A * | 11/1997 | Hassall et al. ............ 428/195.1 |
| 6,577,845 B2 * | 6/2003 | Stevens ...................... 399/408 |
| 6,980,767 B1 * | 12/2005 | Cahill et al. ............... 399/408 |
| 7,347,418 B2 * | 3/2008 | Speller ........................ 271/264 |
| 2007/0164501 A1 | 7/2007 | Brommer |

FOREIGN PATENT DOCUMENTS

| DE | 44 12 091 A1 | 10/1995 |
| FR | 2 672 008 A1 | 7/1992 |
| GB | 2 173 740 A | 10/1986 |
| JP | 57-156933 A | 9/1982 |
| JP | 60-132859 A | 7/1985 |
| JP | 61-170540 U | 10/1986 |
| JP | 1-299138 A | 12/1989 |
| JP | 3-192048 A | 8/1991 |
| JP | 8-132597 A | 5/1996 |
| JP | 2001-38677 A | 2/2001 |

(Continued)

OTHER PUBLICATIONS

Machine English Translation of WO 92/12859.*

*Primary Examiner* — Sing P Chan
(74) *Attorney, Agent, or Firm* — Birch, Stewart, Kolasch & Birch, LLP

(57) ABSTRACT

Described is a sheet-fed offset printing press including: a printing unit 20 printing on paper sheets 1; and laminate unit 40 for applying lamination to the paper sheets 1 printed by the printing unit 20, the lamination unit 40 being provided downstream of the printing unit 20 in a transport direction of the paper sheets 1.

18 Claims, 18 Drawing Sheets

(56) References Cited

FOREIGN PATENT DOCUMENTS

| JP | 2002-370347 A | 12/2002 |
| JP | 2003-127237 A | 5/2003 |
| JP | 2003-237018 A | 8/2003 |
| JP | 2004-26400 A | 1/2004 |
| JP | 2006-507957 A | 3/2006 |
| JP | 2007-176172 A | 7/2007 |
| WO | WO 9212859 A1 * | 8/1992 ............... B41M 1/22 |
| WO | WO 2004/050366 A1 | 6/2004 |

* cited by examiner

SHEET-FED OFFSET PRINTING PRESS

FIELD OF THE INVENTION

The present invention relates to a sheet-fed offset printing press that can apply lamination and printing on a sheet.

BACKGROUND ART

For lamination using a conventional laminating machine for laminating paper sheets with a film, a sheet feeder continuously feeds paper sheets into a position between a pair of pressure rollers in such a manner that each of the paper sheets can partially overlap the paper sheet to be fed next. After a web-like film is fed to the position between the pair of pressure rollers, and adheres to surfaces of the paper sheets, a cutting blade is inserted between each pair of overlapping paper sheets, and then cuts the film, to make the paper sheets separable. The paper sheets are then delivered to a delivery unit. Thus, by using such a laminating machine, paper sheets can be efficiently laminated with a film without wasting any part of a web-like film (see Patent Document 1 below, for example).

Patent Document 1: JP-A 2003-127237
Patent Document 2: JP-A 2001-038677

DISCLOSURE OF THE INVENTION

Problem to be Solved by the Invention

In a conventional way of laminating paper sheets printed by a printing press with a film, printed paper sheets delivered to a delivery unit of the printing press are transferred to the sheet feeder of the above-described lamination machine to laminate the paper sheets with a film in the above-described manner. Such conventional lamination requires lot of time and labor, as well as installation of both a printing press and a laminating machine. Accordingly, the securing of an installation space and human resources has been a problem.

Such being the case, efficient and accurate lamination of printed paper sheets with a film which can be performed in a small space has been strongly desired.

Means for Solving the Problem

To solve the above-described problem, a first invention provides a sheet-fed offset printing press characterized by comprising: printing means for printing on sheets, the printing means including an ink supply unit which supplies ink, a plate cylinder to which the ink is supplied from the ink supply unit, and an impression cylinder which holds the sheets and which transfers the ink from the plate cylinder onto the sheets; and laminate means including a laminate roller for laminating the sheets printed by the printing means with a film, the laminate roller being provided downstream of the printing means in a transport direction of the sheets.

A second invention provides the sheet-fed offset printing press according to the first invention, further comprising overlapping means including an overlap cylinder which is provided between the printing means and the laminate means, and which feeds, to the laminate means, the sheets printed by the printing means, after causing a transport-direction trailing end side of the preceding sheet and a transport-direction leading end side of the subsequent sheet to overlap each other.

A third invention provides the sheet-fed offset printing press according to the second invention, characterized in that the overlap means causes the transport-direction trailing end side of the preceding sheet and the transport-direction leading end side of the subsequent sheet to overlap each other by making a relative difference between transport speeds of the preceding sheet and the subsequent sheet.

A fourth invention provides the sheet-fed offset printing press according to the third invention, the overlap means causes a surface of the preceding sheet and a surface of the subsequent sheet to overlap each other, the surface of the preceding sheet being opposite to a surface to be laminated of the preceding sheet, and the surface of the subsequent sheet being the surface to be laminated.

A fifth invention provides the sheet-fed offset printing press according to the third invention, characterized in that the overlap means causes the transport-direction trailing end side of the preceding sheet and the transport-direction leading end side of the subsequent sheet to overlap each other by making the transport speed of the preceding sheet slower than that of the subsequent sheet.

A sixth invention provides the sheet-fed offset printing press according to the fifth invention, characterized in that the overlap means includes: upstream-side transport means for transporting the sheets printed by printing means; downstream-side transport means for receiving the sheets from the upstream-side transport means, and then transporting the sheets to the laminate means at a transport speed while changing the transport speed, the transport speed being equal to or slower than that at which the upstream-side transport means transports the sheets.

A seventh invention provides the sheet-fed offset printing press according to the sixth invention, characterized in that the upstream-side transport means includes upstream-side hold transport means including an outfeed wheel and the overlap cylinder which transport the sheets while holding the sheets, and the downstream-side transport means including a pair of infeed rollers which transport the sheets while holding the sheets.

An eighth invention provides the sheet-fed offset printing press according to the sixth invention, characterized in that the downstream-side transport means of the overlap means and the laminate means transport the sheets at the same transport speed.

A ninth invention provides the sheet-fed offset printing press according to the sixth invention, characterized in that the downstream-side transport means repeats such a speed change cycle that, after decreasing from the same transport speed as that at which the upstream-side transport means transports the sheets, the transport speed at which the downstream-side transport means transports the sheets increases so as to return to the same transport speed as that at which the upstream-side transport means transports the sheets.

A tenth invention provides the sheet-fed offset printing press according to the ninth invention, characterized in that the downstream-side transport means is capable of changing a rate of change in transport speed of the sheets An eleventh invention provides the sheet-fed offset printing press according to the sixth invention, characterized in that a transfer period is set in which the downstream-side transport means and the upstream-side transport means concurrently transport the same one of the sheets A twelfth invention provides the sheet-fed offset printing press according to the eleventh invention, characterized in that the downstream-side transport means transports the sheets at the same transport speed as that at which the upstream-side transport means transports the sheets, in the transfer period, then decreases the transport speed from the same transport speed as that at which the upstream-side transport means transports the sheets, when the transfer period is completed, and thereafter increases the transport speed so as to return to the same transport speed as that at which the upstream-side transport means transports the sheets.

A thirteenth invention provides the sheet-fed offset printing press according to the third invention further comprising control means that controls the overlap means so that an overlap margin of the transport-direction trailing end side of the preceding sheet and the transport-direction leading end side of the subsequent sheet has a predetermined length in the transport direction.

A fourteenth invention provides the sheet-fed offset printing press according to the thirteenth invention, characterized by further comprising: sheet length setting means for setting the transport-direction length of the sheets; and overlap-margin setting means for setting the overlap margin, the sheet-fed offset printing press characterized in that the control means adjusts the relative difference between the transport speeds of the preceding sheet and the subsequent sheet on the basis of information from each of the sheet length setting means and the overlap-margin setting means, and thereby controls the overlap means to make the overlap margin equal to that set by the overlap-margin setting means.

A fifteenth invention provides the sheet-fed offset printing press according to the fourteenth invention, characterized in that the overlap means includes: upstream-side transport means for transporting the sheets printed by the printing means; and downstream-side transport means for receiving the sheets from the upstream-side transport means, and then transporting the sheets to the laminate means, and, the control means controls the transport speeds at which the downstream-side transport means transports the sheets.

A sixteenth invention provides the sheet-fed offset printing press according to the second invention, characterized in that the laminate means laminates the sheets caused to overlap each other by the overlap means, with a web-like laminate material.

A seventeenth invention provides the sheet-fed offset printing press according to the sixteenth invention, further comprising cutting means for cutting the laminate materials, with which the sheets are laminated, for each of the sheets, the cutting means provided downstream of the laminate means in the transport direction of the sheets.

An eighteenth invention provides the sheet-fed offset printing press according to the seventeenth invention further comprising separation means for transporting the preceding sheet so that the preceding sheet with its laminate material cut is separated from the subsequent sheet by transporting the preceding sheet at speed faster than the subsequent sheet, the separation means being provided downstream of the cutting means in the transport direction of the sheets.

A nineteenth invention provides the sheet-fed offset printing press according to the eighteenth invention, characterized in that the separation means transports the preceding sheet at a speed faster than transport speed of the sheet transported by the printing means.

A twentieth invention provides the sheet-fed offset printing press according to the second invention further comprising a guide table guiding the sheets caused to overlap each other by the overlap means, to the laminate means.

A twenty-first invention provides the sheet-fed offset printing press according to the second aspect, further comprising smoothing means for smoothing out the sheets caused to overlap each other by the overlap means, in the width directions.

A twenty-second invention provides the sheet-fed offset printing press according to the twenty-first invention characterized in that the smoothing means includes a smoothing roller: rotationally supported to have the axial directions in the width directions of the sheets; having at least a peripheral surface made of a flexible material; and including a plurality of bending portions each extending from an axial-direction central side to axial-direction outer sides, and formed at predetermined intervals along the axial directions, so as to be able to bend toward the axial-direction outer sides when the sheets are pressed against the smoothing roller.

Effects of the Invention

Hence, the sheet-fed offset printing press according to the present invention includes the printing means for printing on sheets and laminate means for applying lamination to the sheets transferred from the printing means, the laminate means provided on the transport-direction downstream side of the sheets compared to the printing means. Accordingly, in-line printing and lamination can be performed on a sheet. Thus, process on a sheet can be performed speedily in a small space.

BEST MODES FOR CARRYING OUT THE INVENTION

Main Embodiment

Figure 1:
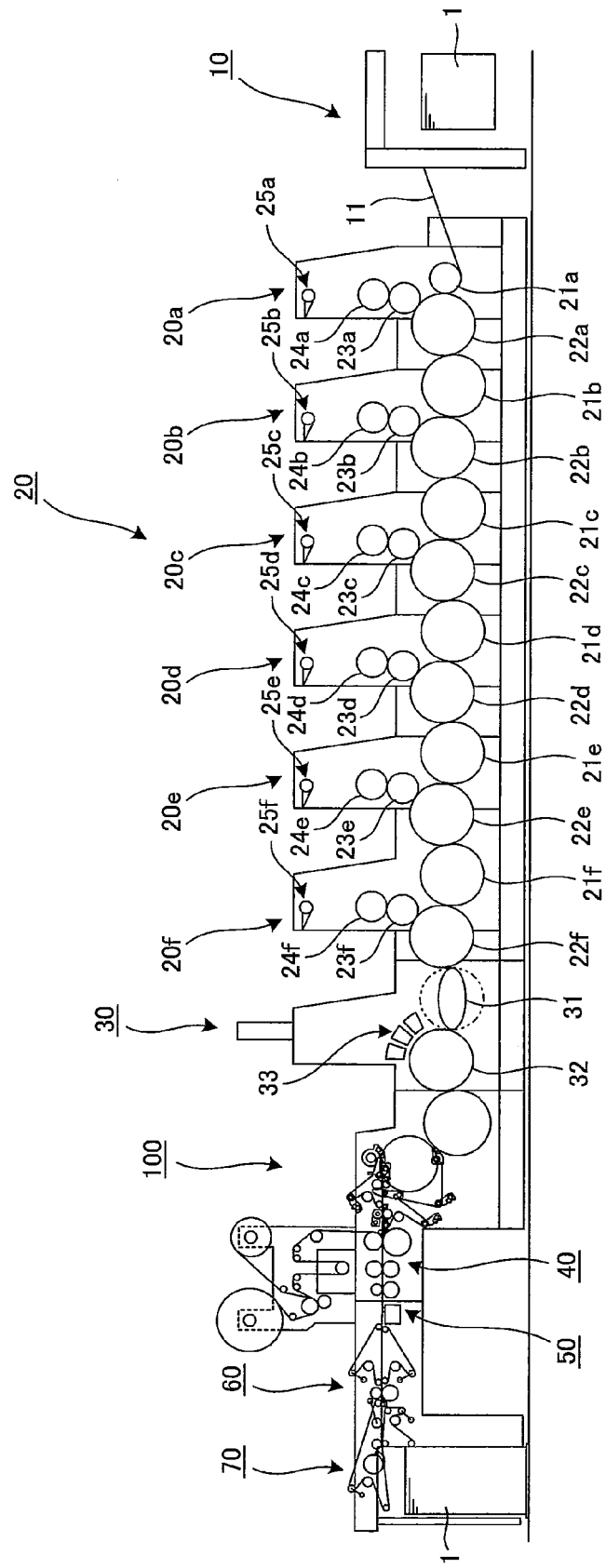
FIG. 1 shows a schematic configuration diagram of an entire sheet-fed offset printing press according to an embodiment of the present invention.
Figure 2:
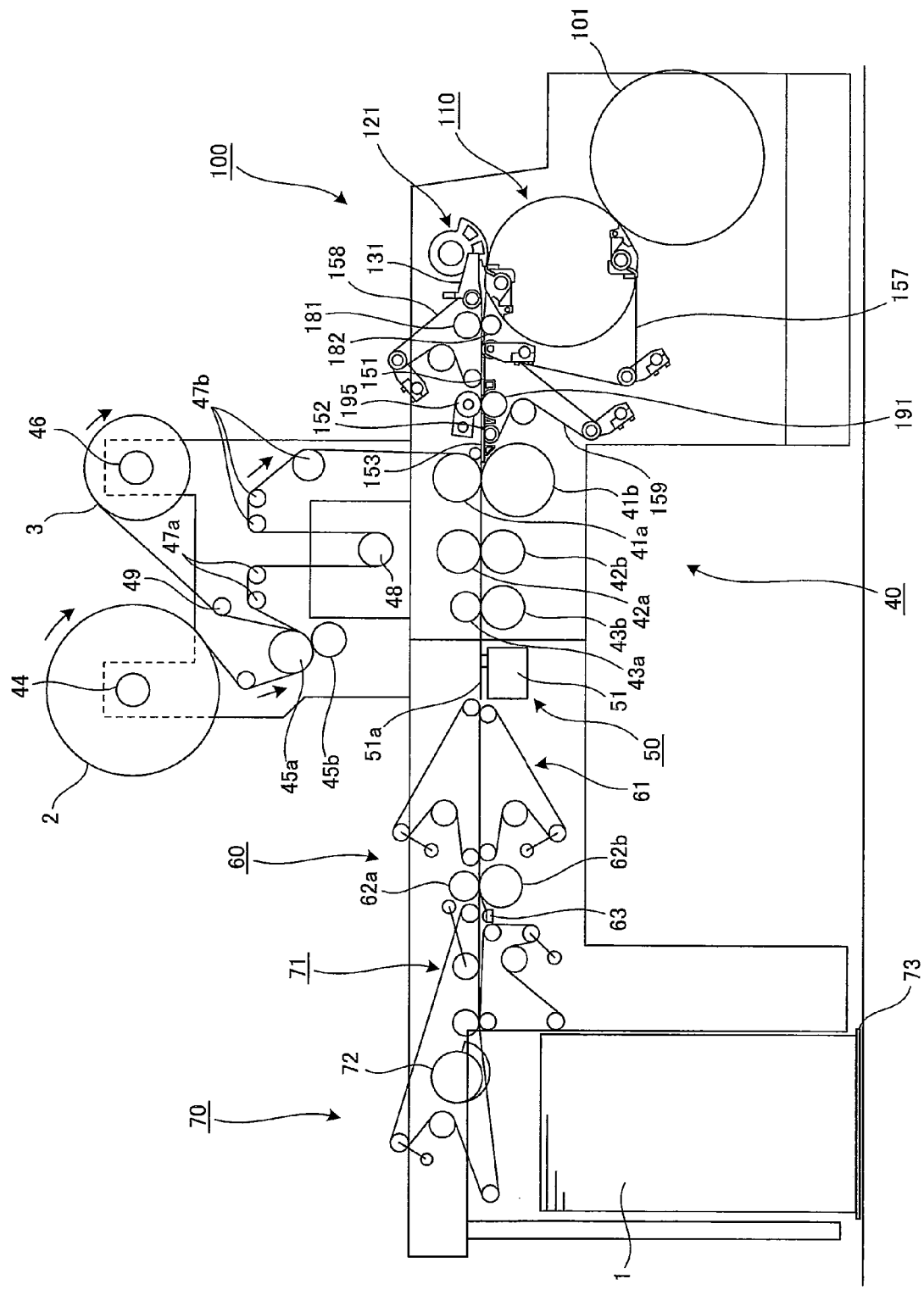
FIG. 2 shows an extracted enlarged view of essential parts of FIG. 1.
Figure 3:
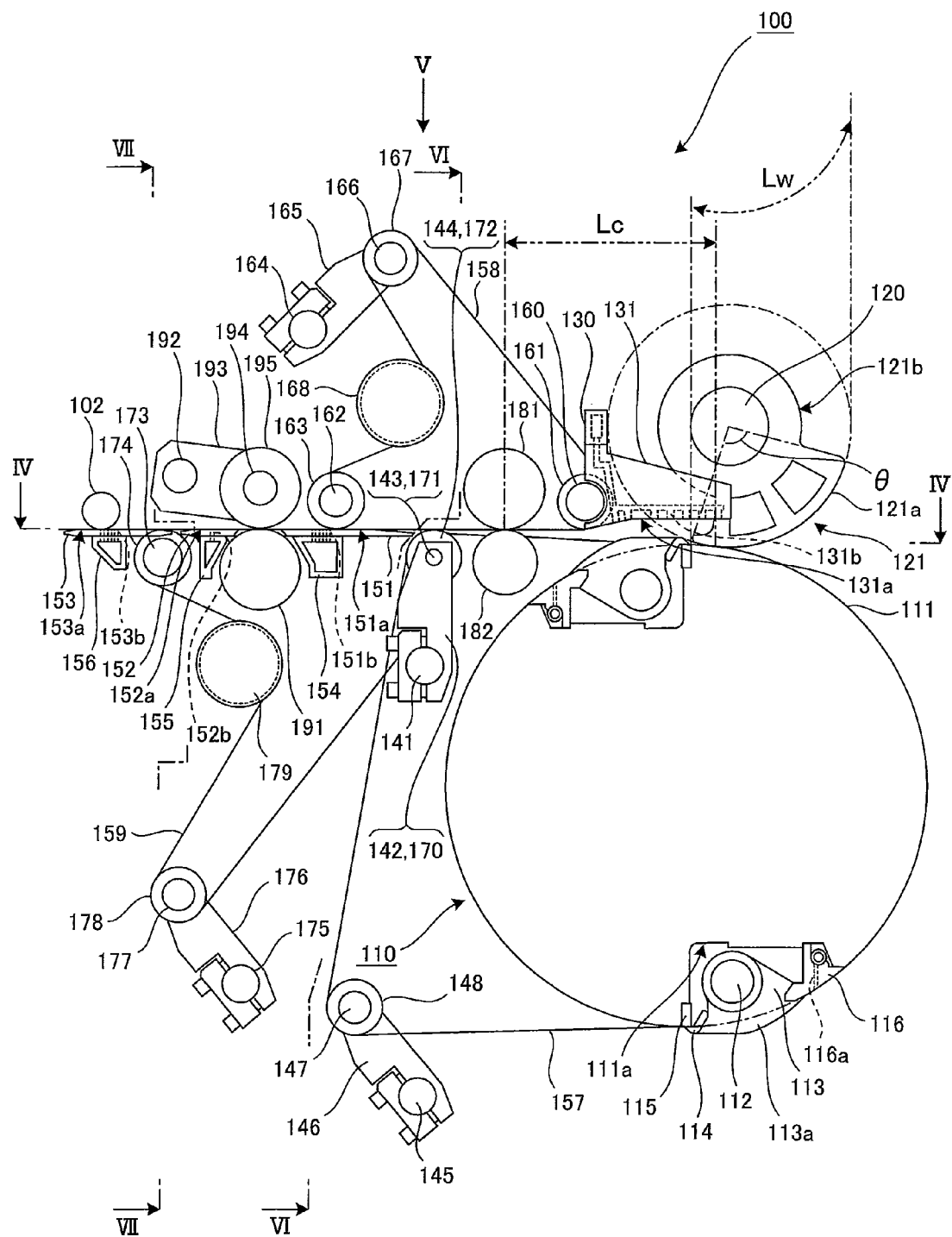
FIG. 3 shows an extracted enlarged view of an overlap unit for causing paper sheets to overlap, shown in FIG. 2.
Figure 4:
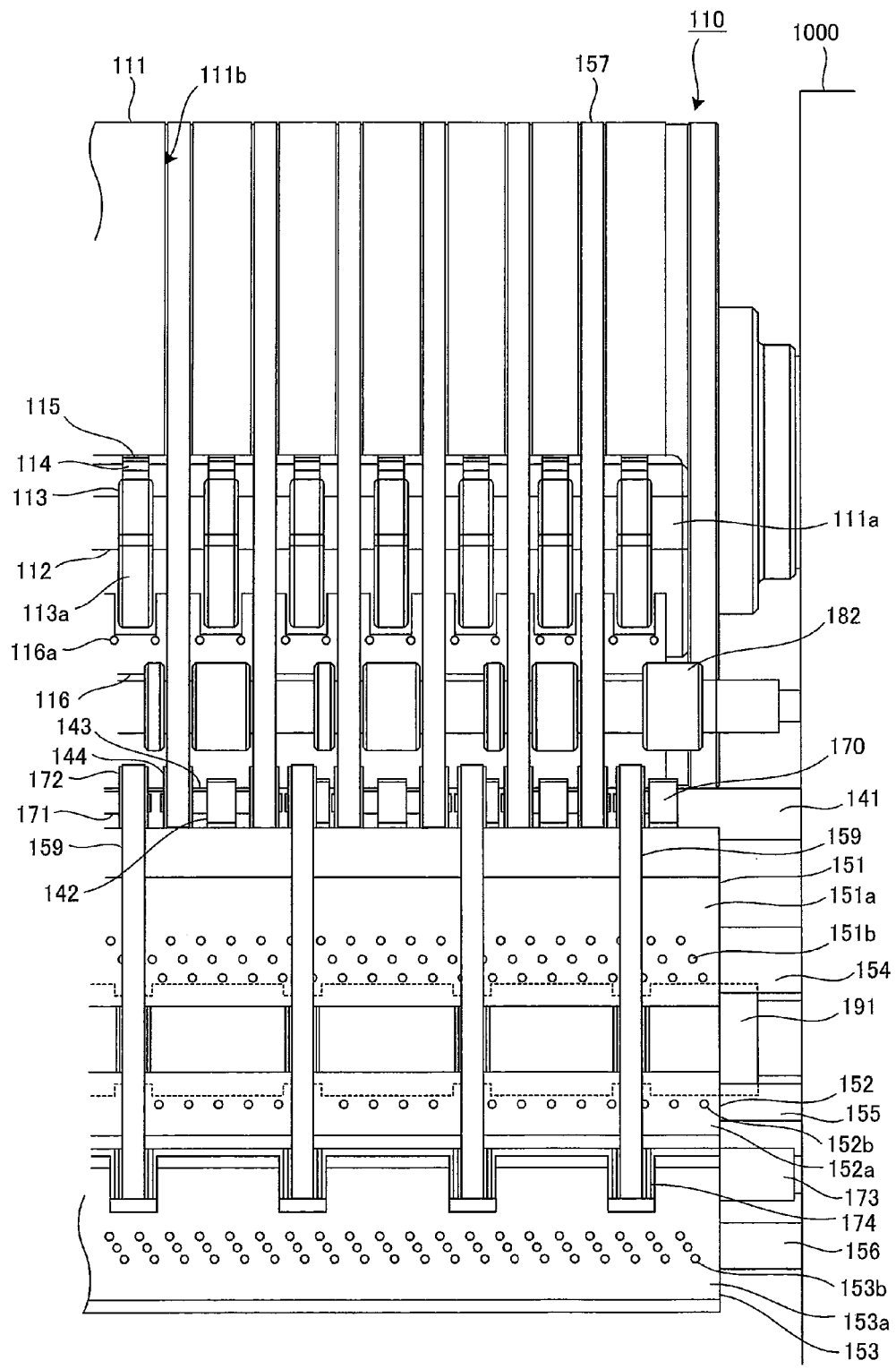
FIG. 4 shows a sectional view taken along a line IV-IV in FIG. 3.
Figure 5:
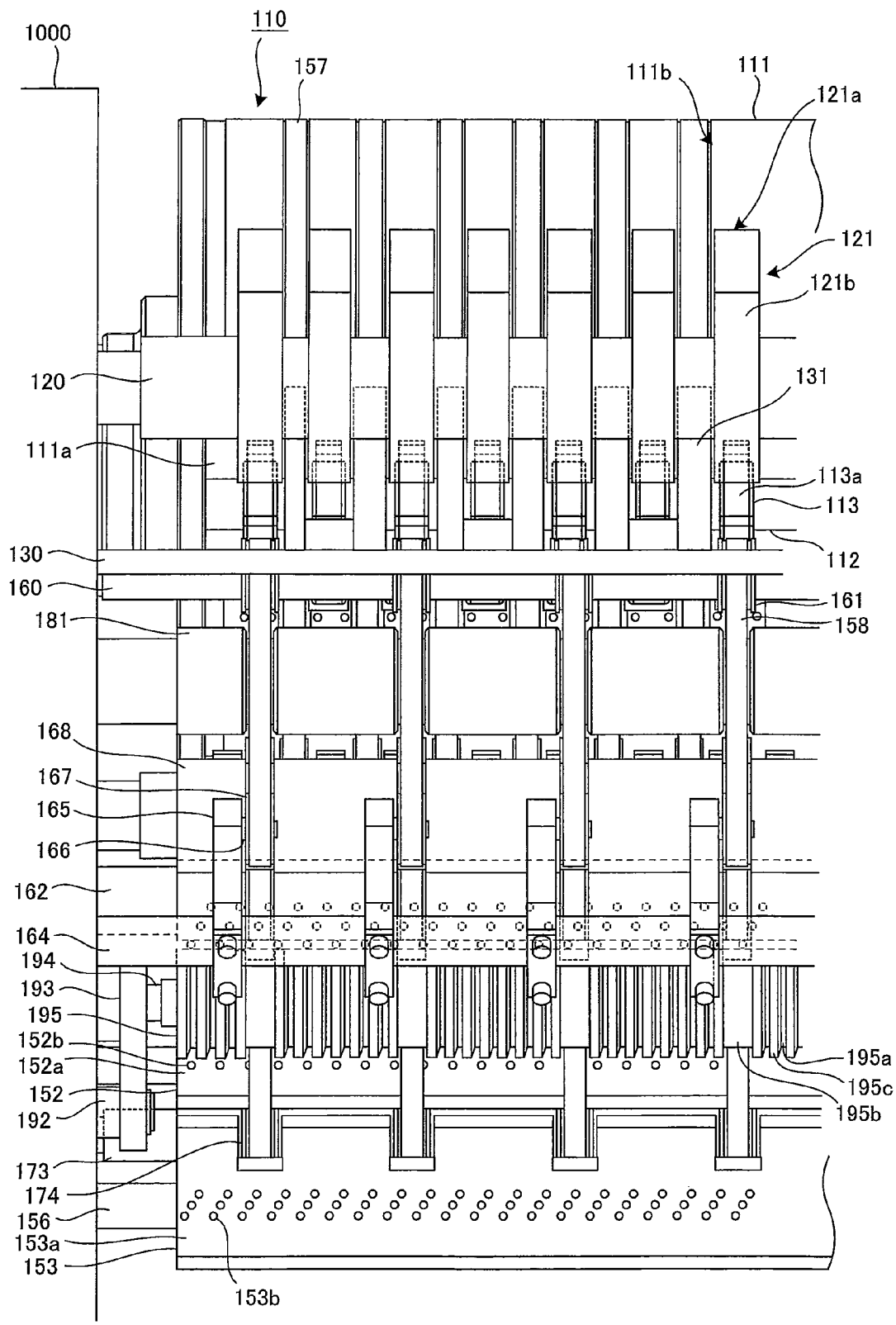
FIG. 5 shows a view seen from the direction of an arrow V in FIG. 3.
Figure 6:
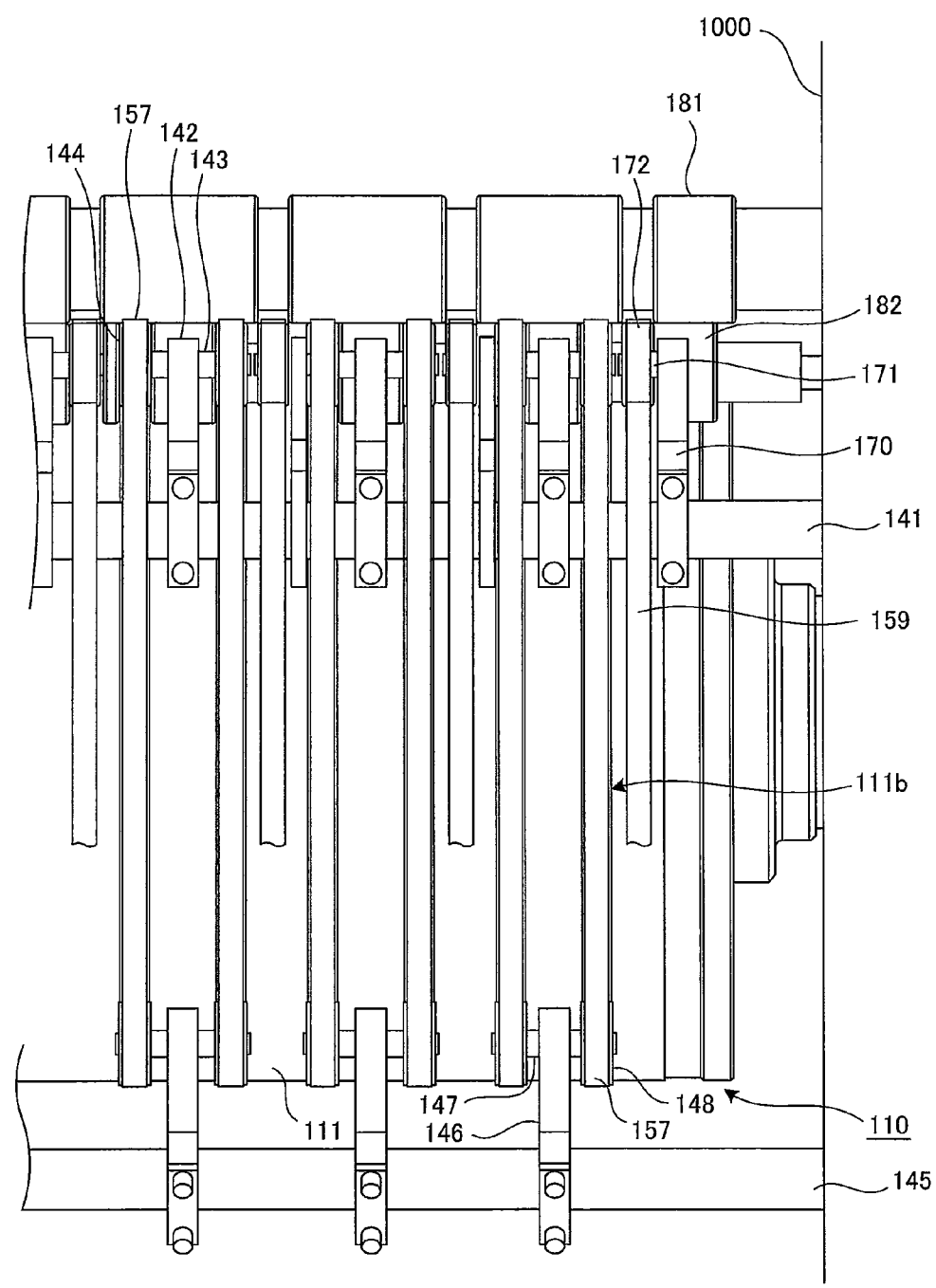
FIG. 6 shows a sectional view taken along a line VI-VI in FIG. 3.
Figure 7:
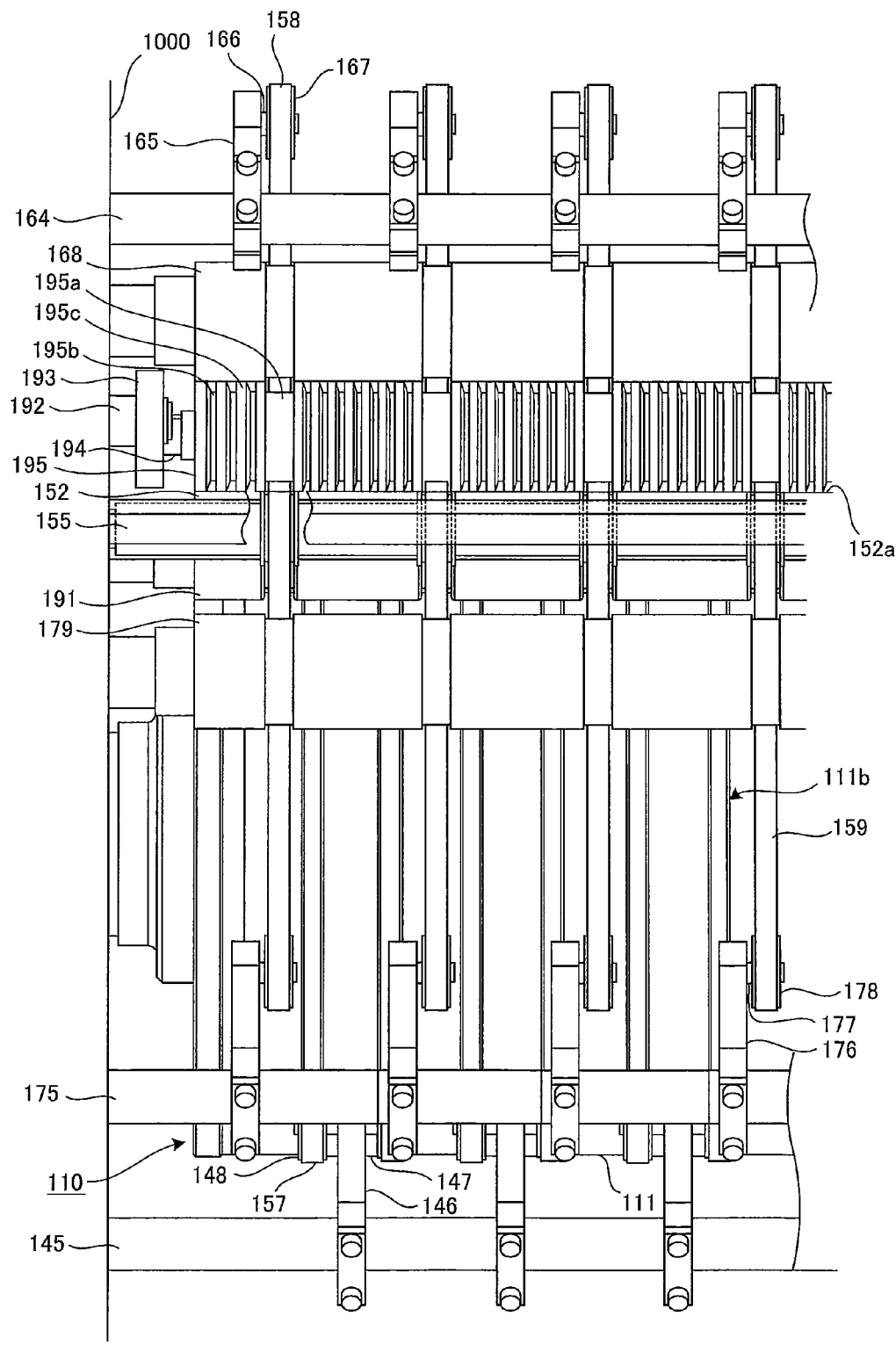
FIG. 7 shows a sectional view taken along a line VII-VII in FIG. 3.
Figure 8:
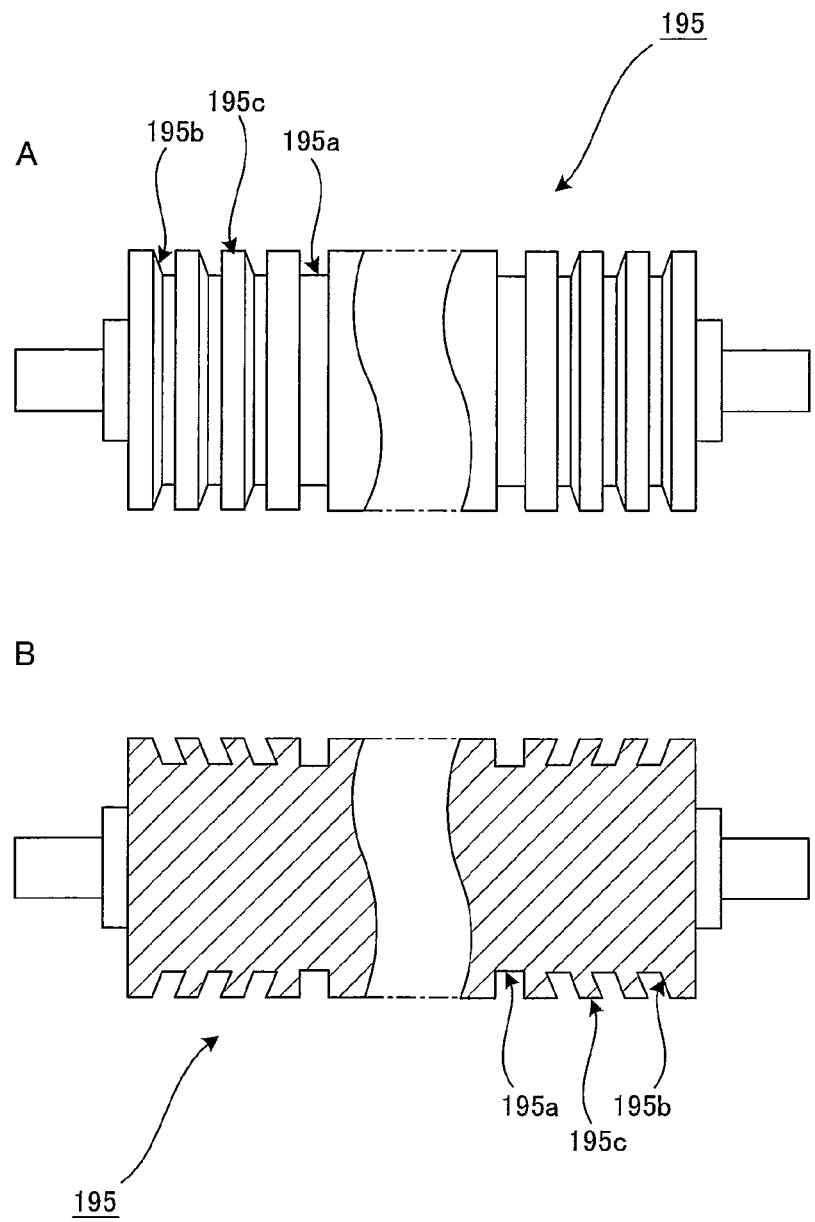
FIG. 8 shows a sectional view of a smoothing roller shown in FIG. 3.
Figure 9:
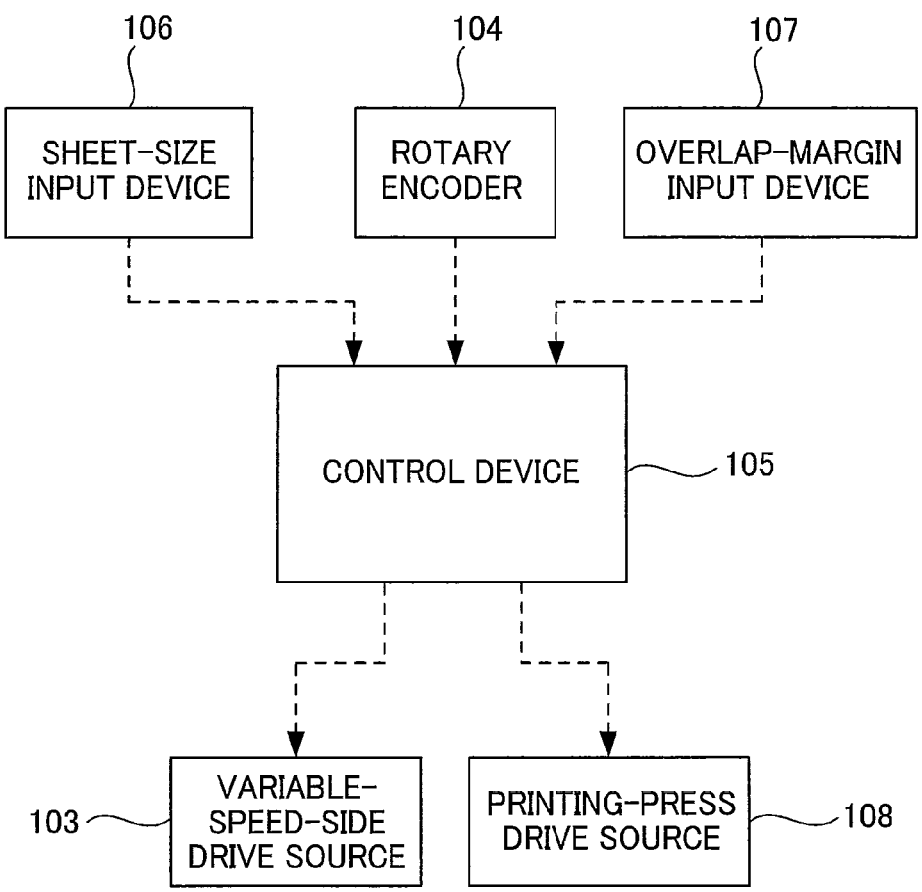
FIG. 9 shows a block diagram of a control system.

An embodiment of a sheet-fed offset printing press according to the present invention will be described on the basis of FIGS. 1 to 9. FIG. 1 shows a schematic configuration diagram of an entire sheet-fed offset printing press according to an embodiment of the present invention, FIG. 2 shows an extracted enlarged view of essential parts of FIG. 1, FIG. 3 shows an extracted enlarged view of an overlap unit shown in FIG. 2, FIG. 4 shows a sectional view taken along a line IV-IV in FIG. 3, FIG. 5 shows a view seen from the direction of an arrow V in FIG. 3, FIG. 6 shows a sectional view taken along a line VI-VI in FIG. 3, FIG. 7 shows a sectional view taken along a line VII-VII in FIG. 3, FIG. 8 shows a sectional view of a smoothing roller shown in FIG. 3, FIG. 9 shows a block diagram of a control system.

As shown in FIG. 1, a supply unit 10 serving as sheet feed means includes a feeder board 11 feeding paper sheets 1 one paper sheet 1 at a time to a transfer cylinder 21a, the paper sheet 1 each being a sheet.

An impression cylinder 22a of the first offset printing unit 20a of the printing unit 20 serving as printing means is provided so as to face the transfer cylinder 21a. A blanket cylinder 23a is provided to face the impression cylinder 22a at a position downstream of the transfer cylinder 21a in the rotation direction of the impression cylinder 22a. A plate cylinder 24a is in contact with the blanket cylinder 23a in a facing manner. The first offset printing unit 20a is provided with an ink supply unit including an ink fountain unit 25a and the like for supplying ink to the plate cylinder 24a as well as a dampening unit for supplying dampening water (not all of which are illustrated).

An impression cylinder 22b of a second offset printing unit 20b is disposed downstream of the blanket cylinder 23a facing the impression cylinder 22a of the first offset printing unit 20b in the transport direction of paper sheets 1 while a transfer cylinder 21b is interposed between the impression cylinder 22b and the impression cylinder 22a. Similar to the first offset printing unit 20a, the second offset printing unit 20b also includes a blanket cylinder 23b, a plate cylinder 24b, an ink supply unit including an ink fountain unit 25b, a dampening unit, and the like, for example.

Moreover, an impression cylinder 22c of a third offset printing unit 20c is disposed downstream of the blanket cylinder 23b facing the impression cylinder 22b of the second offset printing unit 20b in the transport direction of paper sheets 1 while a transfer cylinder 21c is interposed between the impression cylinder 22c and the impression cylinder 22b. Similar to the first and second offset printing units 20a and 20b, the third offset printing unit 20c also includes a blanket cylinder 23c, a plate cylinder 24c, an ink supply unit including an ink fountain unit 25c, a dampening unit, and the like, for example.

Moreover, an impression cylinder 22d of a fourth offset printing unit 20d is disposed downstream of the blanket cylinder 23c facing the impression cylinder 22c of the third offset printing unit 20c in the transport direction of paper sheets 1 while a transfer cylinder 21d is interposed between the impression cylinder 22d and the impression cylinder 22c. Similar to the first to third offset printing units 20a to 20c, the fourth offset printing unit 20d also includes a blanket cylinder 23d, a plate cylinder 24d, an ink supply unit including an ink fountain unit 25d, a dampening unit, and the like, for example.

Moreover, an impression cylinder 22e of a fifth offset printing unit 20e is disposed downstream of the blanket cylinder 23d facing the impression cylinder 22d of the fourth offset printing unit 20d in the transport direction of paper sheets 1 while a transfer cylinder 21e is interposed between the impression cylinder 22e and the impression cylinder 22d. Similar to the first to fourth offset printing units 20a to 20d, the fifth offset printing unit 20e also includes a blanket cylinder 23e, a plate cylinder 24e, an ink supply unit including an ink fountain unit 25e, a dampening unit, and the like, for example.

Moreover, an impression cylinder 22f of a sixth offset printing unit 20f is disposed downstream of the blanket cylinder 23e facing the impression cylinder 22e of the fifth offset printing unit 20e in the transport direction of paper sheets 1 while a transfer cylinder 21f is interposed between the impression cylinder 22f and the impression cylinder 22e. Similar to the first to fifth offset printing units 20a to 20e, the sixth offset printing unit 20f also includes a blanket cylinder 23f, a plate cylinder 24f, an ink supply unit including an ink fountain unit 25f, a dampening unit, and the like, for example.

Furthermore, a holding cylinder 32 of a drying unit 30 serving as drying means is disposed downstream of the blanket cylinder 23f facing the impression cylinder 22f of the sixth offset printing unit 20f in the transport direction of paper sheets 1 while a skeleton transfer cylinder 31 is interposed between the impression cylinder 22f and the holding cylinder 32. A dryer 33 for drying ink on the printed paper sheets 1 is disposed downstream of the transfer cylinder 31 in the rotation direction of the holding cylinder 32. At a position downstream of the dryer 33 in the rotation direction of the holding cylinder 32, a transfer cylinder 101 of an overlap unit 100 is in contact with the holding cylinder 32 in a facing manner, the overlap unit 100 serving as means (or a device) for causing the paper sheets 1 to overlap. The overlap unit 100 has the following configuration.

As shown in FIGS. 1 to 3, an overlap cylinder 110 serving as a transport cylinder is provided downstream of the holding cylinder 32 in the rotation direction of the transfer cylinder 101 serving as a reversing cylinder so as to face the transfer cylinder 101. The overlap cylinder 110 is formed to have a diameter slightly smaller than (specifically, approximately 90% of) that of the transfer cylinder 101. In addition, the overlap cylinder 110 is driven while being coupled to the transfer cylinder 101 with a gear or the like so as to rotate at the same rotation speed as the transfer cylinder 101, that is, so as to rotate once when the transfer cylinder 101 rotates once. Accordingly, the overlap cylinder 110 rotates at a slower peripheral speed than that of the transfer cylinder 101. As shown in FIGS. 3 to 5, a plurality of cutout portions 111a are formed on the peripheral surface of a cylinder body 111 of the overlap cylinder 110 rotatably supported by a frame 1000, and are formed at a predetermined distance from each other, and are each positioned so as to have the longer side along the axial directions of the cylinder body 111 (in this embodiment, two cutout portions 111a are provided so that one can be positioned at an angle of 180° from the other).

Inside each of the cutout portions 111a of the cylinder body 111, a finger shaft 112 is rotatably supported so as to have the axial directions thereof along the axial directions of the cylinder body 111. A plurality of finger holders 113 are attached to the finger shaft 112 along the axial directions of the finger shaft 112 at predetermined intervals. A finger 114 is provided at an end portion on rotation-direction upstream side of the cylinder body 111 of each of the finger holders 113, that is at the end portion of each of the finger holders 113. At the edges on the cylinder body 111 rotation-direction upstream side of the cutout portions 111a of the cylinder body 111, a plurality of finger pads 115 are respectively provided along the axial directions of the cylinder body 111 at predetermined intervals so as to be located in positions corresponding to the fingers 114.

Accordingly, by moving the fingers 114 in a radial direction of the cylinder body 111, the fingers 114 can be brought closer to or away from the finger pads 115. Thereby, the finger shaft 112 can be rotated when the cylinder body 111 is in a predetermined rotation phase, to hold or release the end of the paper sheet 1 (to be described later in detail).

In this embodiment, the above-described finger shaft 112, finger holders 113, fingers 114 and the like form a gripper that is movable outward of the peripheral surface of the cylinder body 111 in the radial direction of the cylinder body 111. The gripper, the finger pads 115 and the like form gripper device constituting holding means for holding the paper sheets 1.

On a side of the finger holders 113, the side facing outward in the radial direction of the cylinder body 111, lift-up portions 113a are respectively provided. Each lift-up portions 113a is an arc shaped protruding portion protruding outward of the periphery of the cylinder body 111 in the radial direction of the cylinder body 111. The lift-up portions 113a of the finger holders 113 bear the transport-direction trailing end side of the preceding paper sheet 1 in order to make a gap between the transport-direction trailing end of the paper sheet 1 and the peripheral surface of the cylinder body 111. Moreover, when the finger shaft 112 rotates to bring the finger pads 115 and the fingers 114 away from each other along with the rotation of the cylinder body 111, the lift-up portions 113a move outward of the peripheral surface of the cylinder body 111 in the radial direction of the cylinder body 111, along with the rotation of the finger shaft 112. Thereby, the transport-direction trailing end side of the preceding paper sheet 1 can be moved so as to be further away from the peripheral surface of the cylinder body 111 outward in the radial direction of the cylinder body 111 (which will be described later in detail).

Here, even though the lift-up portions 113a protrude outward of the peripheral surface of the cylinder body 111 in radial direction of the cylinder body 111, the finger holders 113 dose not interfere with the peripheral surface of the transfer cylinder 101 since the lift-up portions 113a face the cutout portions formed in the peripheral surface of the transfer cylinder 101.

At a position upstream of each of the cutout portions 111a of the cylinder body 111 in the rotation direction of the cylinder body 111, that is, downstream of the finger holders 113 and the like in the transport direction of the paper sheets 1, an injector 116 having injection ports 116a facing outward in the radial direction of the cylinder body 111 is provided along the entire axial-direction length of the cylinder body 111. Each of the injectors 116 has the plurality of injection ports 116a formed at predetermined intervals along the axial directions of the cylinder body 111 so that the injection ports 116a can correspond approximately to the positions of the finger holders 113 in the axial directions of the cylinder body 111.

The injection ports 116a of the injectors 116 are each connected to an unillustrated air compressor for supplying air. Accordingly, by causing the air compressors to operate, air is injected from the injection ports 116a outward in the radial direction of the cylinder body 111, so that the transport-direction trailing end side of the preceding paper sheet 1 can be blown up to be away from the peripheral surface of the cylinder body 111 outward in the radial direction of the cylinder body 111.

In this embodiment, the above-described injectors 116, air compressors and the like form air injection means.

At a position downstream of the transfer cylinder 101 in the rotation direction of the overlap cylinder 110, outfeed wheels 121 are provided so as to face the overlap cylinder 110. The outfeed wheels 121 each have a large-diameter peripheral surface 121a and a small-diameter peripheral surface 121b, the large-diameter peripheral surface 121a cooperating with the peripheral surface of the cylinder body 111 of the overlap cylinder 110 to hold the paper sheet 1, the small-diameter peripheral surface 121b positioning inner than the large-diameter peripheral surface 121a in radial direction. The plurality of outfeed wheels 121 are disposed at predetermined intervals along the axial directions of the cylinder body 111 so as to correspond to the positions of the finger holders 113 in the axial directions of the overlap cylinder 110. The outfeed wheels 121 are each supported by a support shaft 120 rotatably supported by the frame 1000.

As shown in FIG. 3, a peripheral-direction length Lw of the large-diameter peripheral surface 121a of each of the outfeed wheels 121 is set to be slightly larger than a transport distance Lc of the paper sheet 1 between an upstream-side hold position at which the large-diameter peripheral surface 121a and the cylinder body 111 of the overlap cylinder 110 hold the paper sheet 1 and a downstream-side hold position at which upper infeed rollers 181 and lower infeed rollers 182, which will be described later, hold the paper sheet 1. Moreover, an angle $\theta$ between lines, one joining the shaft center of each of the outfeed wheels 121 and a hold start position, the other joining the shaft center of the corresponding outfeed wheel 121 and a hold end position, that is, the central angle (arc angle) $\theta$ of the fan shape having the corresponding large-diameter peripheral surface 121a as the arc, is set to be 110° or smaller, the hold start position and the hold end position being respectively start and end positions at which the corresponding large-diameter peripheral surface 121a and the peripheral surface of the cylinder body 111 of the overlap cylinder 110 hold the paper sheet 1.

The outfeed wheels 121 each have a cutout portion 121c formed at the edge surface between the downstream side end of the large-diameter peripheral surface 121a and the upstream side end of the small-diameter peripheral surface 121b in the rotation direction of the outfeed wheel 121, the a cutout portion 121c formed to avoid interference with the transport-direction trailing end side portion of the preceding paper sheet 1. Furthermore, the large-diameter peripheral surface 121a of each of the outfeed wheels 121 is driven at the same peripheral speed as that of the peripheral surface of the cylinder body 111 of the overlap cylinder 110 (which will be described later in detail).

Near upstream-side hold position at which the overlap cylinder 110 and the corresponding outfeed wheels 121 hold the paper sheet 1, a plurality of suction guides 131 are provided at predetermined intervals along the axial directions of the overlap cylinder 110 so as to be located in positions different from those of the outfeed wheels 121 and the finger holders 113, that is, positions between the adjacent outfeed wheels 121, or the adjacent finger holders 113, in the axial directions of the support shaft 120. The suction guides 131 each have a plurality of suction ports 131b formed in a guide surface 131a facing the overlap cylinder 110. The suction guides 131 are each supported by a support stay 130 supported by the frame 1000.

The guide surfaces 131a of the suction guides 131 each extend from around the upstream-side hold position at which the overlap cylinder 110 and the corresponding outfeed wheels 121 hold the paper sheet 1, toward the downstream side in the transport direction of the paper sheet 1. The suction ports 131b of the suction guides 131 are connected to an unillustrated suction pump via through holes 130a formed inside the support stay 130. Accordingly, by causing the suction pump to operate, the suction guides 131 can guide the paper sheet 1 with the guide surfaces 131a while sucking the paper sheet 1 so that the paper sheet 1 can be away from the peripheral surface of the cylinder body 111 outward in the radial direction of the cylinder body 111.

In this embodiment, the above-described support stay 130, suction guides 131, suction pump and the like form suction means. Furthermore, at least one of the suction means, the air injection means, the holding means (finger device) and the like forms move-away means for bringing the preceding paper sheet 1 away from the peripheral surface of the overlap cylinder 110 in a direction orthogonal to the transport direction, thereby bringing the transport-direction trailing end side of the preceding paper sheet 1 away from the subsequent paper sheet 1 held by the overlap cylinder 110 in the direction orthogonal to the transport direction.

A plurality of belt grooves 111b along the peripheral directions of the cylinder body 111 are formed at predetermined intervals on the peripheral surface of the cylinder body 111 of the overlap cylinder 110 so as to be located in positions different from those of the finger holders 113 in the axial directions of the cylinder body 111, that is, positions between the adjacent finger holders 113.

At the position downstream of the upstream-side hold position at which the overlap cylinder 110 and the corresponding outfeed wheels 121 hold the paper sheet 1 in the rotation direction of the overlap cylinder 110, a plurality of pulleys 144 rotatably supported by the frame 1000 through a shaft 141, arms 142 and shafts 143 are provided at predetermined intervals along the axial directions of the overlap cylinder 110 so as to be located in positions different from those of the finger holders 113 in the axial directions of the overlap cylinder 110, that is, positions between the adjacent finger holders 113, or the same positions as those of the belt grooves 111b of the cylinder body 111 of the overlap cylinder 110.

Lower constant-speed transport belts 157 serving as guide belts are wound respectively around the belt grooves 111b of the cylinder body 111 of the overlap cylinder 110. The lower constant-speed transport belts 157 are wound respectively around the pulleys 144, and also respectively around pulleys 148 rotatably supported by the frame 1000 through a shaft 145, arms 146 and shafts 147, as shown in FIGS. 3, 6, and 7.

Accordingly, the lower constant-speed transport belts 157 guides the paper sheets 1 by traveling via pulleys 144 and 148 along with the rotation of the overlap cylinder 110. More specifically, the lower constant-speed transport belts 157 hold the paper sheet 1 together with the peripheral surface of the overlap cylinder 110 while traveling integrally with the overlap cylinder 110 within a region in which the lower constant-speed transport belts 157 are stretched around the belt grooves 111b of the overlap cylinder 110, to guide the paper sheet 1 in a region from the overlap cylinder 110 to the infeed rollers 181 and 182 to be described later.

In this embodiment, the above-described overlap cylinder 110, support shaft 120, outfeed wheels 121 and the like form upstream-side hold transport means. In addition, the upstream-side hold transport means, the transfer cylinder 101, the shafts 141, 143, 145 and 147, the arms 142 and 146, the pulleys 144 and 148, the lower constant-speed transport belts 157 serving as guiding means and the like form upstream-side transport means.

As shown in FIGS. 3 to 5, a first guide table 151 having a guide surface 151a for guiding the paper sheets 1 is provided downstream of the pulleys 144 in the transport direction of the paper sheets 1. A second guide table 152 having a guide surface 152a for guiding the paper sheets 1 is provided downstream of the first guide table 151 in the transport direction of the paper sheets 1, with a distance between the guide tables 151 and 152. A third guide table 153 having a guide surface 153a for guiding the paper sheets 1 is provided downstream of the second guide table 152 in the transport direction of the paper sheets 1.

A plurality of suction ports 151b to 153b are formed in the guide surfaces 151a to 153a of the guide tables 151 to 153, respectively. In the first guide table 151 or the third guide table 153, each set of a plurality of suction ports 151b or 153b are aligned in the transport direction of the paper sheets 1, and the suction ports 151b or 153b of each set from the upstream side to the downstream side in the transport direction of the paper sheets 1 are arranged to be serially positioned from the inner side toward the outer side in the width directions of the first guide table 151 or the third guide table 153.

Suction boxes 154 to 156 each being hollow in the middle are attached respectively to the lower surfaces of the guide tables 151 to 153. The suction boxes 154 to 156 are supported by the frame 1000, and are connected respectively to the suction ports 151b to 153b. The guide tables 151 to 153 are supported by the frame 1000 through the suction boxes 154 to 156.

The suction boxes 154 to 156 are each connected to an unillustrated suction pump. By causing the suction pumps to operate, the suction ports 151b to 153b of the guide tables 151 to 153 can suck the paper sheet 1 on the guide surfaces 151a to 153a, through the suction boxes 154 to 156. Here, since the suction ports 151b and 153b of the guide tables 151 and 153 are arranged as described above, the paper sheet 1 transported on the guide surface 151a of the guide table 151 or the guide surface 153a of the guide table 153 can be sucked while being pulled outwardly in the width directions of the corresponding guide table.

Near portions of the suction guides 131, the portions being the end portions on the downstream side of the travel direction of the transport belts 157, a plurality of pulleys 161 are provided at predetermined intervals along the axial directions of the overlap cylinder 110 so as to be located in the same positions as the outfeed wheels 121, that is, the positions between the adjacent suction guides 131 in the axial directions of the overlap cylinder 110. The pulleys 161 are each rotatably supported by a support shaft 160 supported by the frame 1000.

Above the guide surface 151a of the first guide table 151, a plurality of pulleys 163 are provided at predetermined intervals along the axial directions of the overlap cylinder 110 so as to be located in the same positions as those of the pulleys 161 in the axial directions of the support shaft 160. The pulleys 163 are each rotatably supported by a support shaft 162 supported by the frame 1000.

Upper variable-speed transport belts 158 are hanged respectively over the pairs of the pulleys 161 and 163, and are also hanged respectively over pulleys 167 rotatably supported above the first guide table 151 by the frame 1000 through a shaft 164, arms 165 and shafts 166, as shown in FIGS. 3 and 7.

A driving roller 168 which is rotatably supported is pressed against the upper variable-speed transport belts 158 above the first guide table 151. Accordingly, when the driving roller 168 is driven and rotated, the upper variable-speed transport belts 158 are caused to travel.

As shown in FIG. 3, the positions, the diameter sizes and the like of the pulleys 144 and 161 are set so that spaces can be made respectively between the lower constant-speed transport belts 157 and the upper variable-speed transport belts 158 in the height directions. Moreover, the positions, the sizes and the like of the suction guides 131 and the pulleys 161 are set so that the guide surfaces 131a of the suction guides 131 can continuously connect with the upper variable-speed transport belts 158, respectively, in the transport direction of the paper sheets 1.

As shown in FIGS. 3 to 5, on an end portion of the guide table 151, the end portion being on the upstream side in the transport direction of the paper sheets 1, a plurality of pulleys 172 rotatably supported by the shaft 141 through arms 170 and shafts 171 are provided at predetermined intervals along the axial directions of the overlap cylinder 110 so as to be in the same positions as those of the finger holders 113 in the axial directions of the overlap cylinder 110, that is, the same positions as those of the upper variable-speed transport belts 158, or the positions between the adjacent lower constant-speed transport belts 157.

At portions of the guide surfaces 152a and 153a, the portions being between the second guide table 152 and the third guide table 153, a plurality of pulleys 174 are provided at predetermined intervals along the axial directions of the overlap cylinder 110 so as to be in the same positions as those of the pulleys 172 along the axial directions of the shaft 141. The pulleys 174 are each rotatably supported by a support shaft 173 supported by the frame 1000.

Lower variable-speed transport belts 159 are hanged respectively over the pairs of the pulleys 172 and 174 so as to be able to travel on the guide surfaces 151a and 152a of the first and second guide tables 151 and 152. The lower variable-speed transport belts 159 are also hanged respectively over pulleys 178 rotatably supported below the guide tables 151 to 153 by the frame 1000 through a shaft 175, arms 176 and shafts 177, as shown in FIGS. 3 and 7.

A driving roller 179 that is rotatably supported is pressed against the lower variable-speed transport belts 159. Accordingly, when the driving roller 179 is driven and rotated, the lower variable-speed transport belts 159 are caused to travel.

Thus, since each of the pairs of the upper variable-speed transport belts 158 and the lower variable-speed transport belts 159 travel while overlapping each other between the corresponding pulleys 172 and 163, the paper sheet 1 can be held while being transported.

As shown in FIGS. 3 to 5, near portions of the overlap cylinder 110, the portions being upstream of the pulleys 144 between the pulleys 161 and the pulleys 163 in the travel direction, the upper infeed rollers 181 are rotatably supported by the frame 1000. The upper infeed rollers 181 are provided with grooves for guiding the travel of the upper variable-speed transport belts 158, the grooves being in the same positions as the corresponding upper variable-speed transport belts 158 in the axial direction of the support shafts 160 and 162.

Near portions of the overlap cylinder 110, the portions being between the overlap cylinder 110 and the pulleys 144, the lower infeed rollers 182, which are in contact respectively with the upper infeed rollers 181 in a facing manner, are rotatably supported by the frame 1000. The lower infeed rollers 182 are provided with grooves for guiding the travel of the lower constant-speed transport belts 157, so as to be in the same positions as the corresponding upper variable-speed transport belts 158 and lower constant-speed transport belts 157 in the axial direction of the overlap cylinder 110.

The height positions of the upper infeed rollers 181 and the lower infeed rollers 182 are set so that each of the pairs of the upper infeed rollers 181 and the lower infeed rollers 182 can be in contact with each other at the same height as that of a transport surface of the upper variable-speed transport belts 158. Accordingly, when the rollers 181 and 182 are driven and rotated, the rollers 181 rollers 182 hold the paper sheet 1 transported by being guided between the upper variable-speed transport belts 158 and the lower constant-speed transport belts 157, to deliver the paper sheet 1 to a position between the upper variable-speed transport belts 158 and the lower variable-speed transport belts 159.

In this embodiment, infeed rollers 181 and 182, and the like form downstream-side hold transport means. In addition, the downstream-side hold transport means, shafts 160, 162, 164, 166, 171, 173, 175 and 177, pulleys 161, 163, 167, 172, 174 and 178, arms 165 and 176, driving rollers 168 and 179, variable-speed transport belts 158 and 159, and the like form downstream-side transport means.

Below the position between the first guide table 151 and the second guide table 152, receiving rollers 191 are rotatably supported by the frame 1000. The receiving rollers 191 are provided with grooves for guiding the travel of the lower variable-speed transport belts 159, the grooves being in the same positions as the corresponding lower variable-speed transport belts 159 in the axial direction of the overlap cylinder 110. The receiving rollers 191 are disposed so that the highest position of the peripheral surface of each of the receiving rollers 191 can be located at the same height as that of the guide surfaces 151a and 152a of the guide tables 151 and 152.

Above a position between the first guide table 151 and the second guide table 152, a smoothing roller 195 is provided so as to be in contact with the receiving rollers 191 in a facing manner. At least peripheral surface of the smoothing roller is made of a flexible material such as rubber or resin.

On the peripheral surface of the smoothing roller 195, a plurality of belt grooves 195a for avoiding the smoothing roller 195 from interfering with the lower variable-speed transport belts 159 are formed at predetermined intervals along the axial directions of the smoothing roller 195. Moreover, on the peripheral surface of the smoothing roller 195, a plurality of inclined grooves 195b, each of which is a groove inclining toward the axial-direction central side from the peripheral surface to the center in the radial direction, are formed at predetermined intervals along the axial directions of the smoothing roller 195, so that bending portions 195c, each of which extending from the axial-direction central side toward the axial-direction outer sides, are formed at predetermined intervals along the axial directions of the smoothing roller 195 (see FIG. 8). The smoothing roller 195 is rotatably supported by the frame 1000 through shafts 192, arms 193 and a shaft 194, and is pressed against the receiving rollers 191.

With this configuration, the smoothing roller 195, together with the receiving rollers 191, presses the paper sheet 1 therebetween, the bending portions 195c thereby bend toward the axial-direction outer sides of the smoothing roller 195, and the smoothing roller 195 rotates along with traveling of the transported paper sheet 1, so that a tension is applied to the paper sheet 1 in the width direction of the smoothing roller 195. Thus, the smoothing roller 195 can smooth out the paper sheet 1.

In this embodiment, the above-described receiving roller 191, shafts 192, arms 193, shaft 194, smoothing roller 195 and the like form smoothing means.

In addition, as shown in FIGS. 1 to 3, a holding roller 102 for pressing the paper sheets 1 against the guide surface 153a is provided above a portion downstream of the guide surface 153a of the third guide table 153 in the transport direction of the paper sheets 1. As shown in FIGS. 1 and 2, a pair of first laminate rollers 41a and 41b of a laminate unit 40 serving as laminate means are provided downstream of the third guide table 153 in the transport direction of the paper sheets 1. A pair of second laminate rollers 42a and 42b are provided downstream in the rotation direction of the first laminate rollers 41*a* and 41*b*. On the downstream side of the rotation direction of the second laminate rollers 42*a* and 42*b*, a pair of feeding rollers 43*a* and 43*b* are provided.

Above the rollers 41*a*, 41*b*, 42*a*, 42*b*, 43*a* and 43*b*, a feed shaft 44 for feeding a film 2, which is a web-like laminate material in a rolled state, is provided. Near the feed shaft 44, a pair of film feed rollers 45*a* and 45*b* for sending out the rolled film 2 held by the feed shaft 44, and a winding shaft 46 for winding a release paper 3 from the film 2 delivered by the film feed rollers 45*a* and 45*b*, are provided. Near the winding shaft 46, a plurality of guide rollers 47*a* and 47*b* for guiding the film 2 delivered by the film feed rollers 45*a* and 45*b* to a position between the first laminate rollers 41*a* and 41*b* are provided.

Between the guide rollers 47*a* and 47*b*, a dancer roller 48, around which the film 2 between the guide rollers 47*a* and 47*b* are hanged, and which can move upwardly and downwardly, is provided. The dancer roller 48 moves upwardly or downwardly in accordance with a desired speed at which the film 2 is to be fed to the first laminate rollers 41*a* and 41*b*, so that the speed at which the film 2 is delivered from the feed shaft 44 and also the speed at which the release paper 3 is wound by the winding shaft 46 can be kept constant.

With this configuration, in the laminate unit 40, the film feed rollers 45*a* and 45*b* send out the film 2 held by the feed shaft 44. Then, the winding shaft 46 winds and thereby collects the release paper 3. The film 2 is fed into the position between the first laminate rollers 41*a* and 41*b*, and then into the position between the second laminate rollers 42*a* and 42*b* via the guide rollers 47*a*, 47*b*, the dancer roller 48 and the like. Thereafter, the film 2 is continuously laminated to the paper sheets 1, and the laminated paper sheets 1 are consequently delivered from the feeding rollers 43*a* and 43*b*, the paper sheets 1 having caused to overlap each other in the overlap unit 100 so that a trailing end portion of the preceding paper sheet 1 and a leading end portion of the subsequent paper sheet 1 in the transport direction of the paper sheets 1 can overlap each other. Here, the reference numeral 49 in FIG. 2 indicates a guide roller for guiding the release paper 3.

A cutting mechanism 51 of a cutting unit 50 serving as cutting means is provided downstream in the rotation direction of the feeding rollers 43*a* and 43*b*. In the cutting mechanism 51, a blade 51*a* is inserted between the overlapping end portions of the preceding paper sheet 1 and the subsequent paper sheet 1. Then, the blade 51*a* is moved in the width directions of the paper sheets 1. Thereby, the film 2 continuously laminating the paper sheets 1 is cut for each of the paper sheets 1 (for more details, see Patent Document 2, for example).

A belt-type transport mechanism 61 of a separation unit 60 serving as separation means is provided downstream of the cutting mechanism 51 in the transport direction of the paper sheets 1. A pair of acceleration rollers 62*a* and 62*b* for sending out the paper sheets 1 at a speed faster than the transport speed of the transport mechanism 61 is provided downstream of the transport mechanism 61 in the transport direction of the paper sheets 1. A guide member 63 for guiding the paper sheets 1 delivered from position between the acceleration rollers 62*a* and 62*b* toward a send-out direction is provided downstream in the rotation direction of the acceleration rollers 62*a* and 62*b*.

With this configuration, the continuous film 2 is cut by the cutting mechanism 51 of the cutting unit 50, and is thereby separated for each of the paper sheets 1. The separated paper sheets 1 are fed to a position between the acceleration rollers 62*a* and 62*b* through the transport mechanism 61, and are then delivered at a speed faster than the transport speed of the transport mechanism 61. Thereby, the preceding paper sheet 1 and the subsequent paper sheet 1 are separately delivered one by one.

A belt-type transport mechanism 71 of a delivery unit 70 serving as sheet delivery means is provided downstream of the guide member 63 in the transport direction of the paper sheets 1 to communicate with the guide member 63. Below a position downstream of the transport mechanism 71 in the transport direction of the paper sheets 1, a delivery board 73 is provided. A delivery cam 72 for causing the paper sheets 1 transported by the transport mechanism 71 to fall onto the delivery board 73 is provided downstream of the transport mechanism 71 in the transport direction of the paper sheets 1.

With this configuration, the paper sheets 1 separated by the acceleration rollers 62*a* and 62*b* of the separation unit 60 are one by one transported by the transport mechanism 71 and consequently delivered onto the delivery board 73 by the delivery cam 72.

As shown in FIG. 9, a rotary encoder 104 serving as phase detection means for detecting the rotation phase of the overlap cylinder 110 by detecting the phase of the sheet-fed offset printing press is electrically connected to the control device 105 serving as control means. A variable-speed-side drive source 103 for causing the driving rollers 168 and 179 of the overlap unit 100, the rollers 41*a*, 41*b*, 42*a*, 42*b*, 43*a* and 43*b* of the laminate unit 40, the cutting mechanism 51 of the cutting unit 50, the belt driving rollers of the transport mechanism 61 of the separation unit 60, and the like to operate in association is electrically connected to the control device 105. In addition, a sheet-size input device 106 and an overlap-margin input device 107 are also electrically connected to the control device 105, the sheet-size input device 106 serving as sheet length setting means for setting the length of the paper sheet in the printing direction (transport direction), the overlap-margin input device 107 serving as overlap-margin setting means for setting a film-laminate-direction (transport-direction) overlap amount (overlap margin) at the transport-direction trailing end side of the preceding paper sheet 1 and the transport-direction leading end side of the subsequent paper sheet 1. On the basis of information from the rotary encoder 104 and the input devices 106 and 107, the control device 105 can control the operation of the variable-speed-side drive source 103 to make the overlap amount (overlap margin) equal to the set amount (which will be described later in detail). Here, the reference numeral 108 in FIG. 9 denotes a printing-press drive source electrically connected to the control device 105 to drive the sheet-fed offset printing press.

Figure 10:
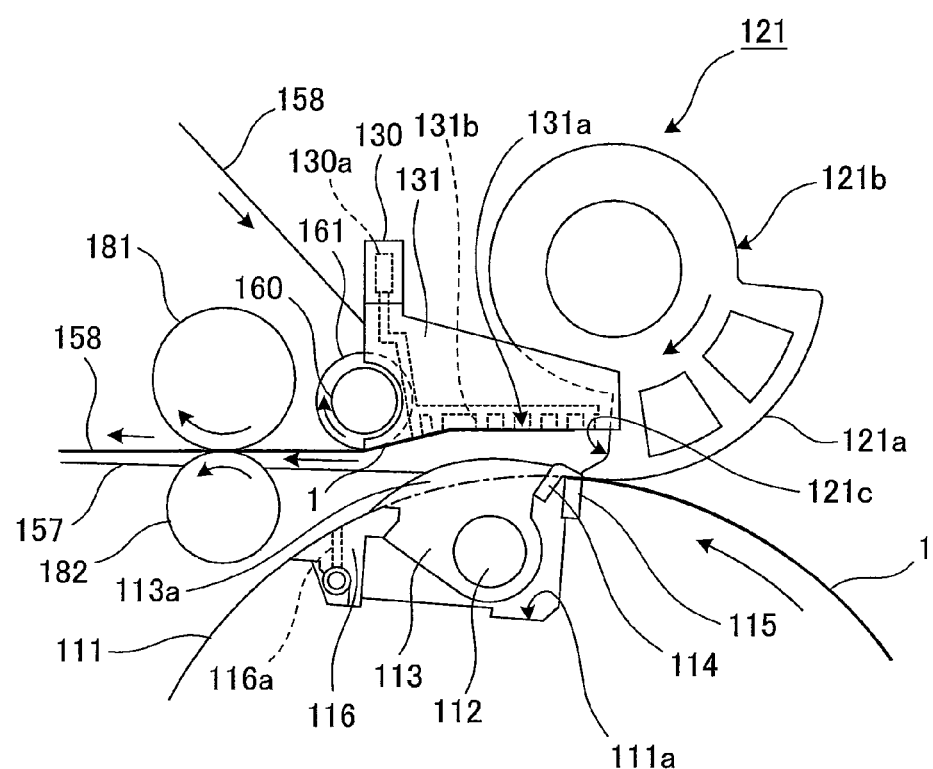
FIG. 10 shows a view for explaining operations of the overlap unit and an outfeed roller shown in FIG. 3.
Figure 11:
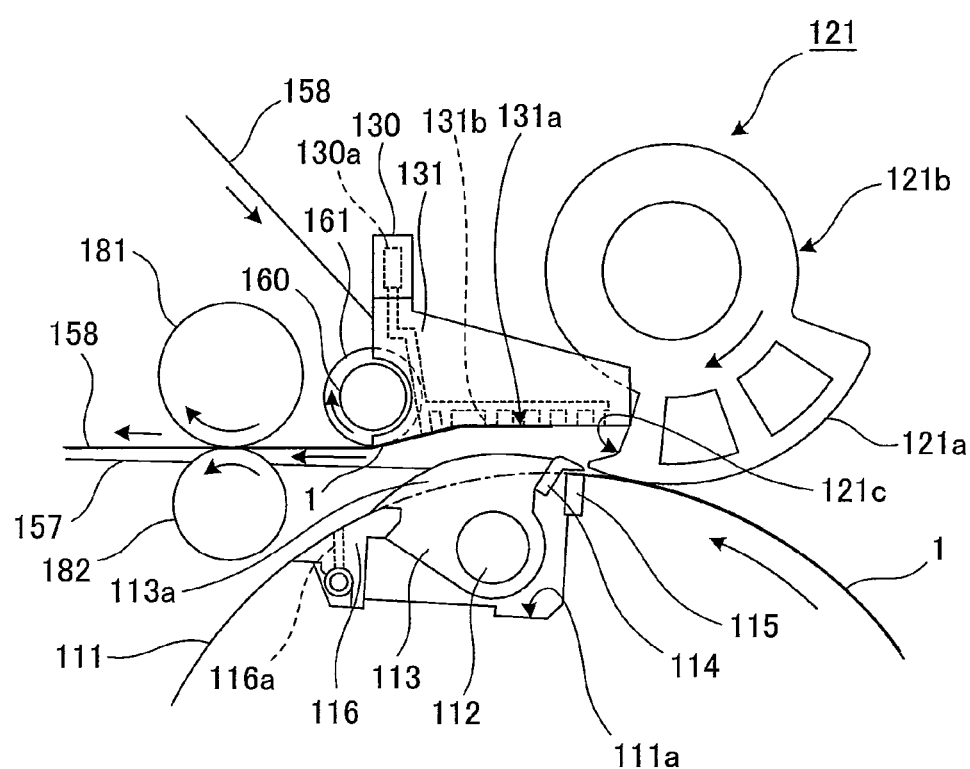
FIG. 11 shows an operation explanation view subsequent to FIG. 10.
Figure 12:
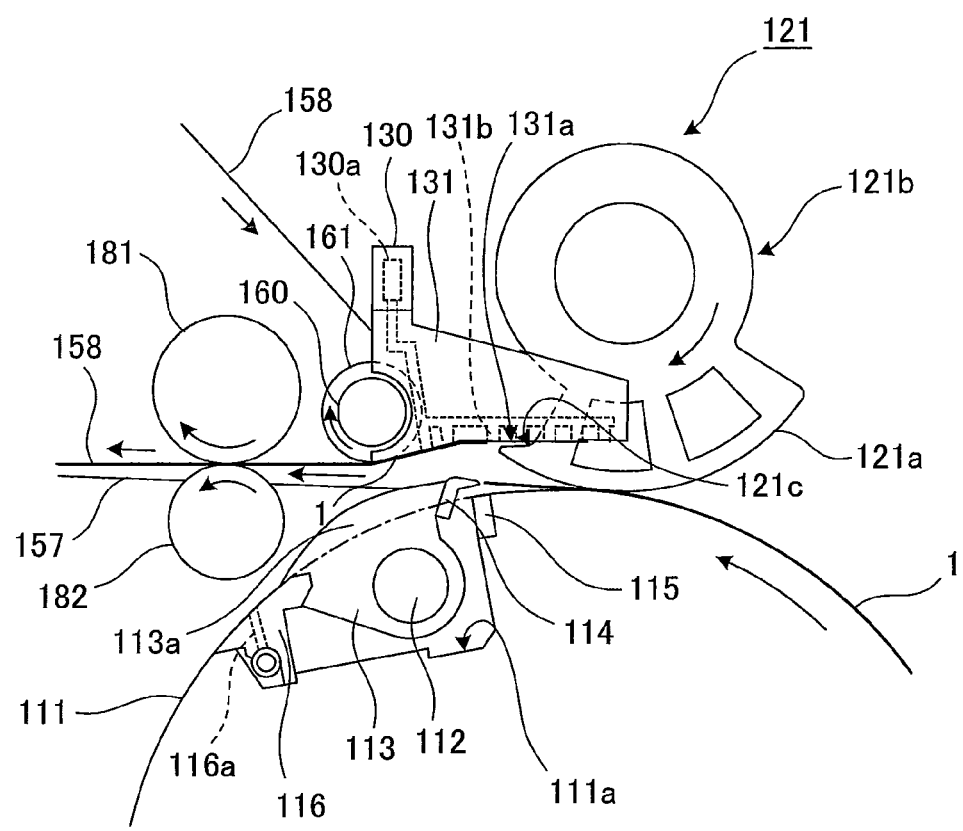
FIG. 12 shows an operation explanation view subsequent to FIG. 11.
Figure 13:
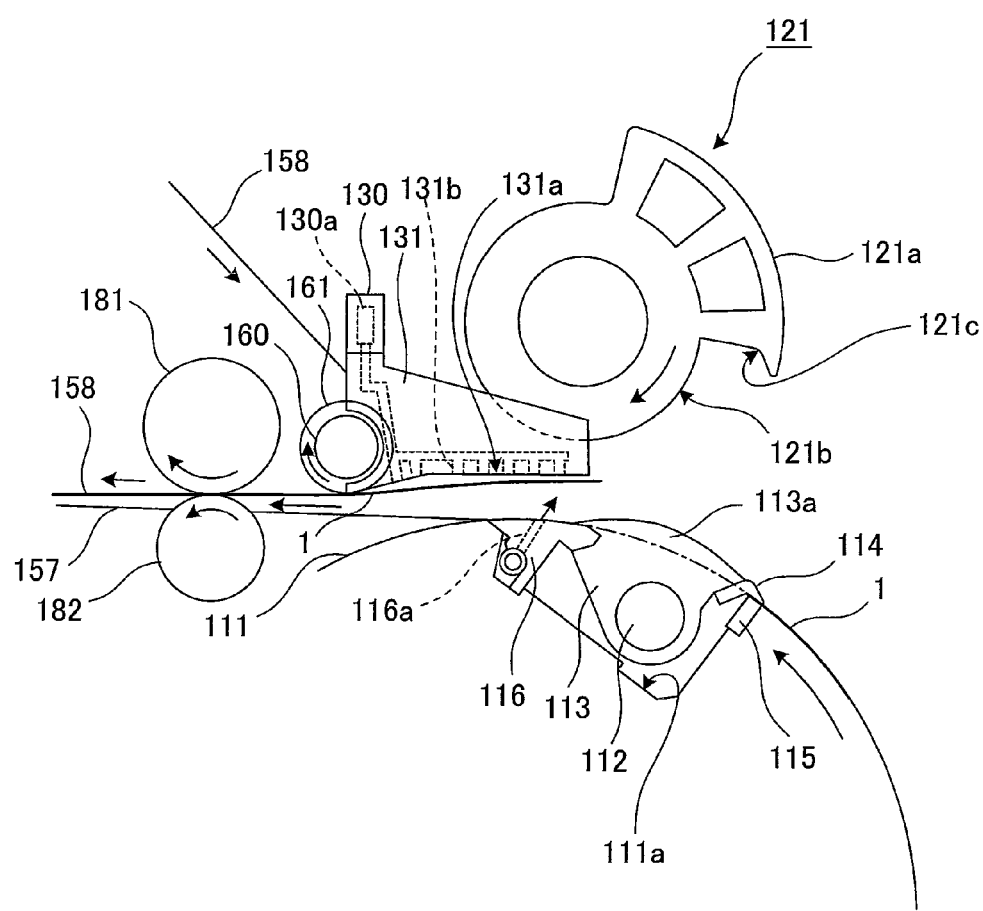
FIG. 13 shows a view for explaining an operation of an injector shown in FIG. 3.
Figure 14:
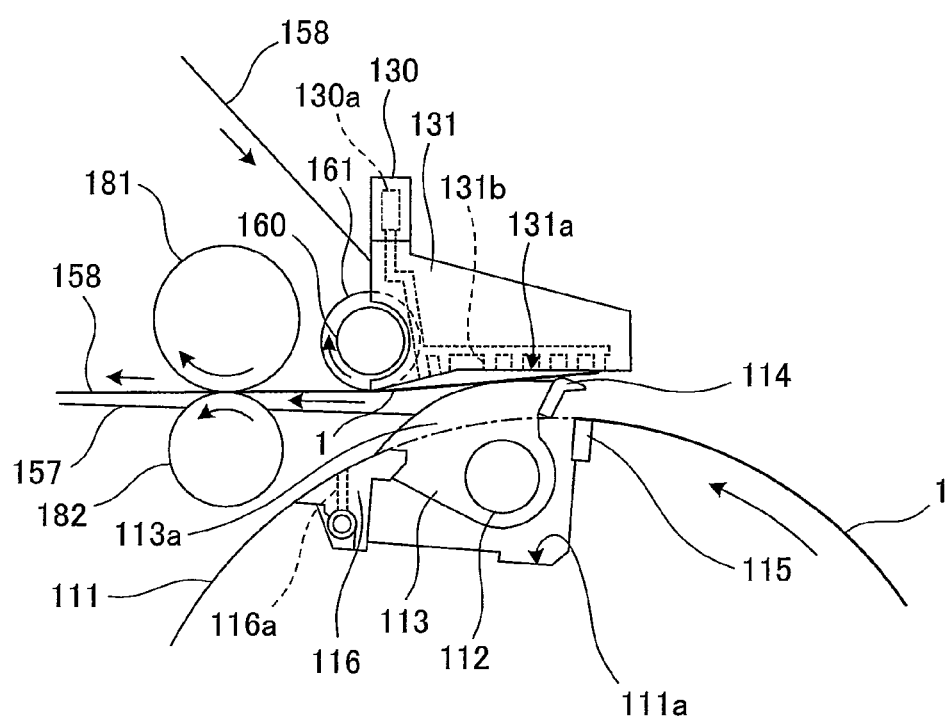
FIG. 14 shows a view for explaining an operation of lift-up portions of finger holders shown in FIG. 3.
Figure 15:
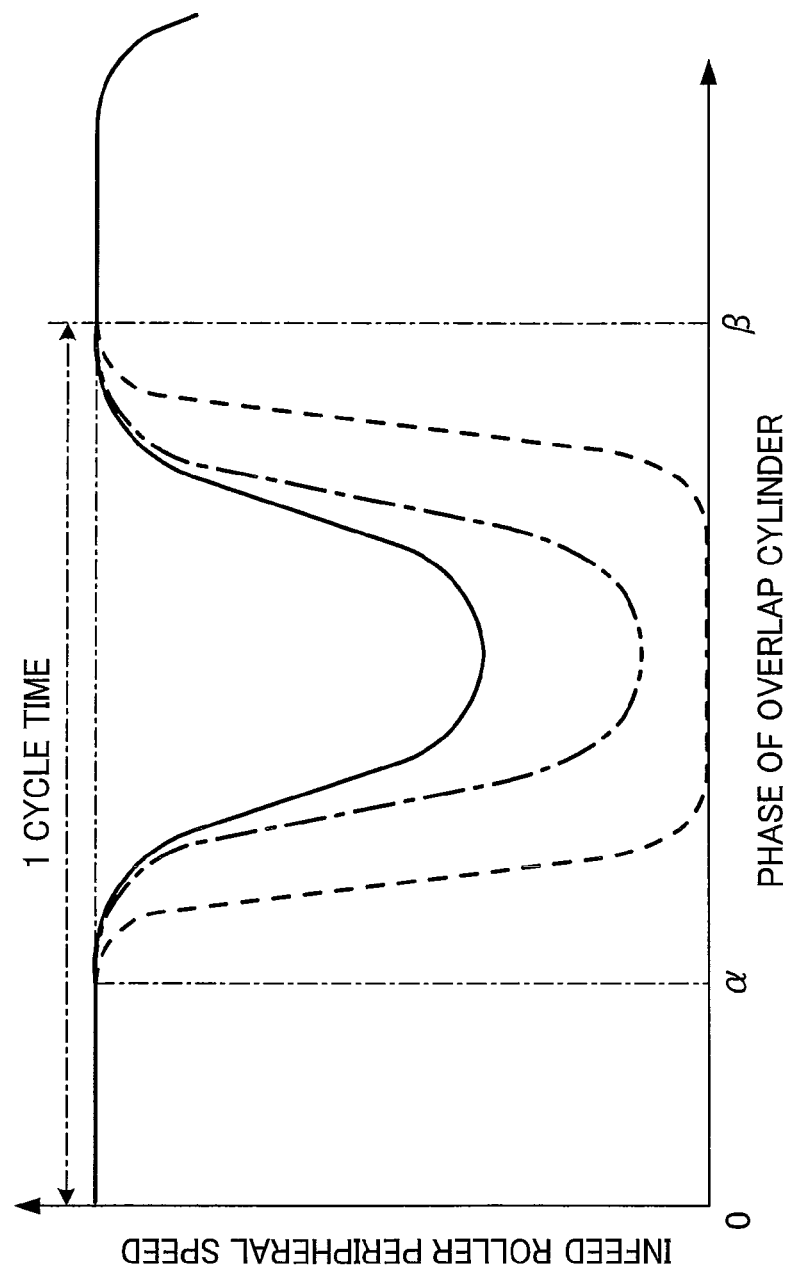
FIG. 15 shows a graph describing a relationship between phase of an overlap cylinder and peripheral speed of an infeed roller.
Figure 16:
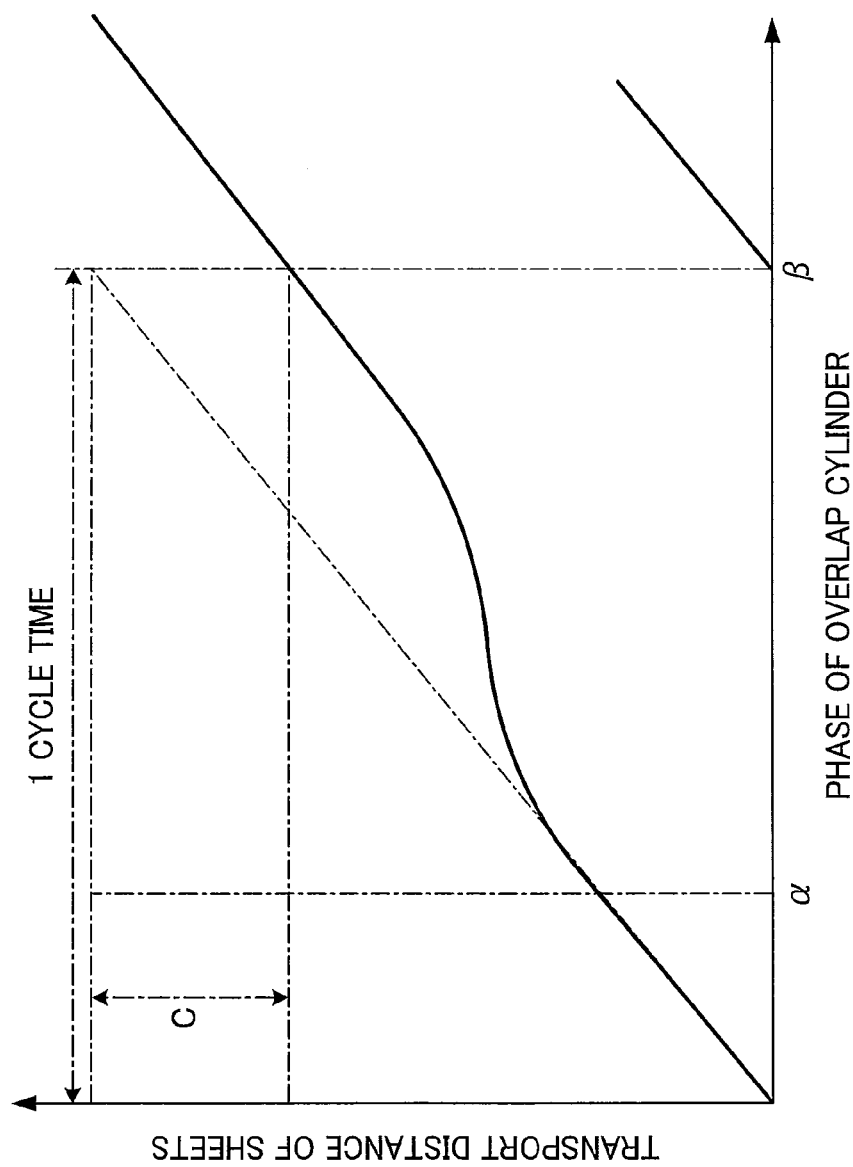
FIG. 16 shows a graph describing a relationship between phase of the overlap cylinder and transport distance of a sheet.
Figure 17:
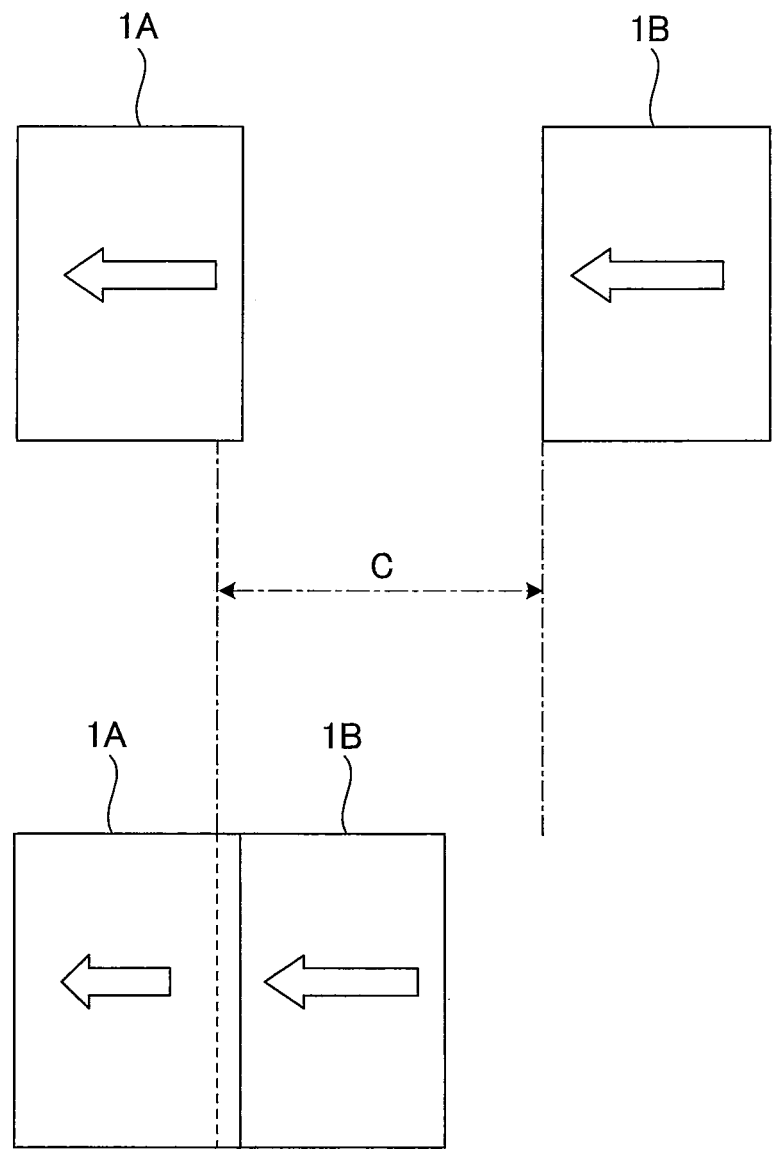
FIG. 17 shows an explanatory diagram describing a feeding state of paper sheets in the overlap unit.
Figure 18:
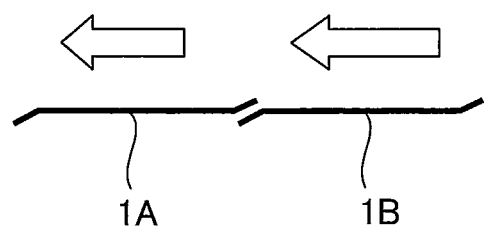
FIG. 18 shows an explanatory diagram describing a state of the paper sheets overlapped in the overlap unit.

Operations of the sheet-fed offset printing press according to this embodiment will be described on the basis of FIGS. 10 to 18. FIG. 10 shows an operation explanation view of the overlap cylinder and the outfeed roller shown in FIG. 3. FIG. 11 shows an operation explanation view subsequent to FIG. 10. FIG. 12 shows an operation explanation view subsequent to FIG. 11. FIG. 13 shows an operation explanation view of the injector shown in FIG. 3. FIG. 14 shows an operation explanation view of the lift-up portions of the finger holders shown in FIG. 3. FIG. 15 shows a graph describing a relationship between phase of the overlap cylinder and peripheral speed of the infeed roller. FIG. 16 shows a graph describing a relationship between phase of the overlap cylinder and transport distance of a paper sheet. FIG. 17 shows an explanatory diagram describing a transport state of paper sheets in the overlap unit. FIG. 18 shows an explanatory diagram describing a state of the paper sheets overlapped in the overlap unit.

Firstly, the print-direction (transport-direction) length of the paper sheets 1 and a film-laminate-direction (transport-direction) overlap amount (overlap margin) of the paper sheets 1 are inputted to the input devices 106 and 107, and are thereby set. Subsequently, the paper sheets 1 stacked on the feeder 10 are one by one fed to the transfer cylinder 21a through the feeder board 11, and are then each transferred to the impression cylinder 22a of the first offset printing unit 20a of the printing unit 20. Ink and dampening water supplied from the ink supply unit and the dampening unit to the plate cylinder 24a are transferred onto the paper sheet 1 through the blanket cylinder 23a, and printing of the first color is thus applied to the paper sheet 1. Thereafter, the paper sheet 1 is transferred to the impression cylinder 22b of the second offset printing unit 20b through the transfer cylinder 21b, and printing of the second color is applied to the paper sheet 1 in the second offset printing unit 20b as in the first offset printing unit 20a. Similarly, printing of the third color to printing of the sixth color are applied to the paper sheet 1 in the third to sixth offset printing units 20c to 20f. Thereafter, the paper sheet 1 is transferred to the holding cylinder 32 of the drying unit 30 through the transfer cylinder 31, and the inks printed on the paper sheet 1 in the printing units 20a to 20f are dried by the dryer 33.

The paper sheet 1 the ink on which is dried in the drying unit 30 is transported through the transfer cylinder 101 of the overlap unit 100. Then, the transport-direction leading end side of the paper sheet 1 is gripped by the fingers 114 and the finger pads 115 of the overlap cylinder 110, and is thereby held and transported by the overlap cylinder 110.

Here, since the cylinder body 111 has a smaller diameter than that of the transfer cylinder 101, the peripheral speed of the overlap cylinder 110 is slower than that of the transfer cylinder 101. Accordingly, the overlap cylinder 110 transports the paper sheets 1 at a slower speed than that of the transfer cylinder 101, that is, transports the paper sheets 1 at a reduced speed. Thus, the cylinder body 111 can function as sheet speed reduction means.

Then, the paper sheet 1 transported by being held around the peripheral surface of the cylinder body 111 of the overlap cylinder 110 is pressed by the large-diameter peripheral surfaces 121a of the outfeed wheels 121 when passing the outfeed wheels 121, and is thereby held by the large-diameter peripheral surfaces 121a of the outfeed wheels 121 and the cylinder body 111 of the overlap cylinder 110 in cooperation (see FIG. 10). The outfeed wheels 121 are set to have such a phase that the large-diameter peripheral surfaces 121a can start pressing the transport-direction leading end side of the paper sheet 1 from a position near the fingers 114 while avoiding contact with the fingers 114.

After the paper sheet 1 is held by the large-diameter peripheral surfaces 121a of the outfeed wheels 121 in cooperation with the peripheral surface of the cylinder body 111 of the overlap cylinder 110, the finger shaft 112 of the overlap cylinder 110 rotates to bring the fingers 114 and the finger pads 115 away from each other. Thereby, the transport-direction leading end side of the paper sheet 1 is released from the grip and retention by the fingers 114 and the finger pads 115 (see FIG. 11).

Here, the paper sheet 1 is first held by the outfeed wheels 121 and the overlap cylinder 110, and the grip and retention by the fingers 114 and the finger pads 115 is released. Accordingly, the paper sheet 1 can be transported without being out of alignment.

Then, a position of the paper sheet 1, the position where the paper sheet 1 is held by the outfeed wheels 121 and the peripheral surface of the cylinder body 111 of the overlap cylinder 110, moves downstream in the rotation-direction, that is, downstream in the transport direction of the paper sheets 1, along with the rotation of the overlap cylinder 110 and the outfeed wheels 121. Consequently, the transport-direction leading end side of the paper sheet 1 is gradually separated from the peripheral surface of the cylinder body 111 of the overlap cylinder 110 (see FIG. 12).

Subsequently, along with further rotation of the overlap cylinder 110 and the outfeed wheels 121, the transport-direction leading end side of the paper sheet 1 is delivered to a position between the lower constant-speed transport belts 157 and the upper variable-speed transport belts 158.

In this event, since the suction pump operates to cause the suction guides 131 to suck at the suction ports 131b, the transport-direction trailing end side of the preceding paper sheet 1 is sucked by and adheres to the suction guides 131. Accordingly, the transport-direction leading end side of the paper sheet 1 is delivered below the transport-direction trailing end side of the preceding paper sheet without clashing with the transport-direction trailing end side of the preceding sheet.

Along with further rotation of the overlap cylinder 110 and the outfeed wheels 121, the paper sheet 1 transported from the position between the overlap cylinder 110 and the outfeed wheels 121 is transported to a position between the infeed rollers 181 and 182 while being guided between the lower constant-speed transport belts 157 and the upper variable-speed transport belts 158.

When the transport-direction leading end side of the paper sheet 1 is held between the infeed rollers 181 and 182, the paper sheet 1 is brought away from the large-diameter peripheral surfaces 121a, and is released from the state held between the outfeed wheels 121 and the peripheral surface of the cylinder body 111 of the overlap cylinder 110.

Here, the paper sheet 1 is firstly held by the infeed rollers 181 and 182, and is then released from the state held between the outfeed wheels 121 and the overlap cylinder 110. In other words, the configuration is made to have a period in which the paper sheet 1 is transferred while being held between the infeed rollers 181 and 182 as well as between the outfeed wheels 121 and the overlap cylinder 110 concurrently. Accordingly, the paper sheet 1 is transferred to the position between the infeed rollers 181 and 182 without being out of alignment.

Then, when the paper sheet 1 is held between the infeed rollers 181 and 182 and is released from the state held between the outfeed wheels 121 and the overlap cylinder 110 (phase a in FIG. 15), the control device 105 detects the current phase on the basis of the information from the rotary encoder 104, and then controls the variable-speed drive source 103: to once reduce the speeds of the infeed rollers 181 and 182, the variable-speed transport belts 158 and 159, the receiving rollers 191, the laminate rollers 41a, 41b, 42a and 42b and the feeding rollers 43a and 43b of the laminate unit 40, the cutting mechanism 51 of the cutting unit 50, the transport mechanism 61 of the separation unit 60 and the like, to be lower than the speed at which the outfeed wheels 121 and the overlap cylinder 110 transport the paper sheet 1 (includes stopped state); and to thereafter increases the speeds of the infeed rollers 181 and 182, the variable-speed transport belts 158 and 159, the receiving rollers 191, the laminate rollers 41a, 41b, 42a and 42b and the feeding rollers 43a and 43b of the laminate unit 40, the cutting mechanism 51 of the cutting unit 50, the transport mechanism 61 of the separation unit 60 and the like, up to the speed at which the outfeed wheels 121 and the overlap cylinder 110 transport the sheet, by the time the subsequent paper sheet 1 is held around the peripheral surface of the cylinder body 111 of the overlap cylinder 110 and is then held between the large-diameter peripheral surfaces 121a of the outfeed wheels 121 and the peripheral surface of the cylinder body 111 (phase β in FIG. 15: at the completion of 1 cycle).

With this configuration, the transport speed of the paper sheets 1 by the infeed rollers 181 and 182, the variable-speed transport belts 158 and 159, the receiving rollers 191 and the like becomes equal to or lower than the transport speed of the paper sheets 1 by the outfeed wheels 121 and the overlap cylinder 110, so that the transport speed of the preceding paper sheet 1 transported by the members 158, 159, 181, 182, 191 and the like becomes lower than the transport speed of the subsequent paper sheet 1 transported by the outfeed wheels 121 and the overlap cylinder 110. Consequently, the transport-direction leading end side of the subsequent paper sheet 1 overlaps the transport-direction trailing end side of the preceding paper sheet 1.

Then, the speed of the members 158, 159, 181, 182, 191 and the like, the operations of which have once slowed down or stopped, increases again up to the same speed as the transport speed of the paper sheets 1 by the outfeed wheels 121 and the overlap cylinder 110, so that the transport speed of the preceding paper sheet 1 by the members 158, 159, 181, 182, 191 and the like comes to the same as that of the subsequent paper sheet 1 by the outfeed wheels 121 and the overlap cylinder 110. Thereby, the transport-direction leading end side of the subsequent paper sheet 1 is held by the infeed rollers 181 and 182 while being in a state of overlapping the transport-direction trailing end side of the preceding paper sheet 1.

Here, since the transport speed of the paper sheets 1 by the members 158, 159, 181, 182, 191 and the like becomes the same as that by the outfeed wheels 121 and the overlap cylinder 110, when the infeed rollers 181 and 182 as well as the outfeed wheels 121 and the overlap cylinder 110 hold the same paper sheet 1 (the subsequent paper sheet 1) simultaneously, this paper sheet 1 can be transported at the same speed, without any difference in speed between the transport-direction leading end side and the transport-direction trailing end side of the paper sheet 1. Thereby, the paper sheet 1 can be transported without being bent, and the transport of the paper sheets 1 can be carried out without any jam.

Specifically, on the basis of the vertical-direction (transport-direction) length of the paper sheets 1 and the vertical-direction overlap amount (overlap margin) of the paper sheets 1 set in advance, the control device 105 sets the speed change rates of the infeed rollers 181 and 182 as well as the variable-speed transport belts 158 and 159, the receiving rollers 191, the laminate rollers 41a, 41b, 42a and 42b and the feeding rollers 43a and 43b of the laminate unit 40, the cutting mechanism 51 of the cutting unit 50, the transport mechanism 61 of the separation unit 60 and the like so that these rates would be in any of the states shown in FIG. 15.

To be more specific, when the vertical-direction length of the paper sheets 1 set in advance is small, or the vertical-direction overlap amount (overlap margin) of the paper sheets 1 set in advance is large, the control device 105 controls the operation of the variable-speed drive source 103 with such a setting that the speed reduction rate would be large (the alternate long and short dash line in FIG. 15).

By contrast, when the vertical-direction length of the paper sheets 1 set in advance is large, or the vertical-direction overlap amount (overlap margin) of the paper sheets 1 set in advance is small, the control device 105 controls the operation of the variable-speed drive source 103 with such a setting that the speed reduction rate would be small (the solid line in FIG. 15).

Further, when the vertical-direction length of the paper sheets 1 set in advance is extremely small, or the vertical-direction overlap amount (overlap margin) of the paper sheets 1 set in advance is extremely large, the control device 105 controls the operation of the variable-speed drive source 103 with such a setting that the speed reduction rate would include a temporally stop (the broken line in FIG. 15).

Here, the above-described control device 105 controls the operation of the above-described variable-speed drive source 103 by a method of calculating the change rate by using an arithmetic expression stored in advance, on the basis of the vertical-direction length and the vertical-direction overlap amount (overlap margin) of the paper sheets 1 inputted from the input devices 106 and 107, or by a method of choosing a change rate pattern among the change rate patterns stored in advance, the change rate patterns corresponding to the vertical-direction length and the vertical-direction overlap amount (overlap margin) of the paper sheets 1 inputted from the input devices 106 and 107, for example.

With this configuration, as shown in FIG. 16, the transport distance of the paper sheets 1 by the infeed rollers 181 and 182 per unit time is smaller than that by the overlap cylinder 110 and the outfeed wheels 121 per unit time. Accordingly, the distance between the preceding paper sheet 1 and the subsequent paper sheet 1 can be shortened by a distance C, so that the subsequent paper sheet 1 can overlap the preceding paper sheet 1.

Subsequently, when the transport-direction trailing end side of the paper sheet 1 is separated from the peripheral surface of the cylinder body 111 along with further rotation of the overlap cylinder 110, the transport-direction trailing end side of the paper sheet 1 is blown up toward the suction guides 131 side by the air injection from the injection ports 116a of the injector 116 of the overlap cylinder 110 caused by the operation of the compressor, as shown in FIG. 13. Thereby, the transport-direction trailing end side of the paper sheet 1 is moved to a direction orthogonal to a plane along the transport direction, in other words, is moved so as to be away from the overlap cylinder 110 outward in the radial direction of the overlap cylinder 110. Thus, transport-direction trailing end side of the paper sheet 1 is prevented from returning to the peripheral surface of the overlap cylinder 110.

Here, the paper sheet 1 that has been subsequent to the preceding paper sheet 1 becomes a new preceding paper sheet 1, and the transport-direction trailing end side thereof is to overlap a new subsequent paper sheet 1.

Then, when the overlap cylinder 110 further rotates, the finger holders 113 come to be located below the transport-direction trailing end side of the preceding paper sheet 1. Thereby, the transport-direction trailing end side of the paper sheet 1 is supported in a direction orthogonal to the transport direction by the lift-up portions 113a so as to have a space between the transport-direction trailing end side of the paper sheet 1 and the peripheral surface of the cylinder body 111 of the overlap cylinder 110. Thus, the transport-direction trailing end side of the paper sheet 1 is separated from the subsequent paper sheet 1 transported while being held by the overlap cylinder 110, for certain.

Thereafter, when the subsequent paper sheet 1, similarly to the preceding paper sheet 1, is held around the peripheral surface of the cylinder body 111 of the overlap cylinder 110 and is then held between the peripheral surface of the cylinder body 111 and the large-diameter peripheral surfaces 121a of the outfeed wheels 121, the finger shaft 112 rotates so as to bring the fingers 114 and the finger pads 115 of the overlap cylinder 110 away from each other as described above. Thereby, the lift-up portions 113a of the finger holders 113 of the overlap cylinder 110 move outward in the radial direction of the overlap cylinder 110 as shown in FIG. 14. Consequently, the transport-direction trailing end side of the preceding paper sheet 1 is moved to be further away from the peripheral surface of the cylinder body 111 of the overlap cylinder 110 in a direction orthogonal to the transport direction of the paper sheet 1, and is lifted up toward the suction guide 131. Thus, a space is ensured between the transport-direction trailing end side of the preceding paper sheet 1 and the subsequent paper sheet 1 transported while being held by the overlap cylinder 110, for certain.

In short, the transport-direction trailing end side of the preceding paper sheet 1 is lifted up so as to be away from the subsequent paper sheet 1 transported by the overlap cylinder 110, for sure, and is thereby sucked to adhere to the guide surfaces 131a of the suction guides 131, for sure, by the air injection from the injection ports 116a of the injector 116 of the overlap cylinder 110 (see FIG. 13), by the lift-up by the lift-up portions 113a of the finger holders 113 (see FIG. 14), and by the suction by the suction ports 131b of the suction guides 131 (see FIG. 11).

Thereby, the preceding paper sheet 1 is transported by the infeed rollers 181 and 182 while keeping the state of being away from the subsequent paper sheet 1. Accordingly, the transport-direction leading end side of the subsequent paper sheet 1 is delivered below the transport-direction trailing end side of the preceding paper sheet 1 to overlap with the transport-direction trailing end side of the preceding paper sheet 1, for sure.

Here, the cutout portion 121c is formed in the end surface between the rotation-direction upstream side of the large-diameter peripheral surface 121a and the rotation-direction downstream side of the small-diameter peripheral surface 121b of each of the outfeed wheels 121. Consequently, the preceding paper sheet 1 is transported without the transport-direction trailing end side interfering with the outfeed wheels 121. Accordingly, the paper sheet 1 is prevented from being damaged for certain.

The paper sheets 1 are transported so that the preceding paper sheet 1 and the subsequent paper sheet 1 can be transported as described above. As a result, the interval between a preceding paper sheet 1A and a subsequent paper sheet 1B is shortened, and the preceding paper sheet 1A and the subsequent paper sheet 1B are delivered from the position between the infeed rollers 181 and 182 in such a manner that transport-direction trailing end side of a lower surface of the preceding paper sheet 1A, that is, the surface opposite to the surface to be laminated, can overlap the transport-direction leading end side of an upper surface of the subsequent paper sheet 1B, that is, the surface to be laminated, as shown in FIGS. 17 and 18.

The paper sheets 1 delivered from the position between the infeed rollers 181 and 182 with the transport-direction end portions overlapping each other are then fed to a position between the variable-speed transport belts 158 and 159 to be further transported onto the guide table 151.

The paper sheets 1 transported onto the guide table 151 are fed to a position between the receiving rollers 191 and the smoothing roller 195 by the lower variable-speed transport belts 159 while being sucked due to the suction by the suction ports 151b to 153b of the guide tables 151 to 153, the suction caused by the suction pump through the suction boxes 154 to 156.

As described above, a plurality of the suction ports 151b are formed in the first guide table 151 in a way that each set of a plurality of suction ports 151b are aligned in the transport direction of the paper sheets 1, and the suction ports 151b of each set from the upstream side to the downstream side in the transport direction of the paper sheets 1 are arranged to be serially positioned from the inner side toward the outer side in the width directions of the first guide table 151. Accordingly, the paper sheets 1 are sucked so as to be pulled toward width-direction outer sides, and are thus smoothed out toward the width-direction outer sides.

Then, after the paper sheets 1 fed to the position between the receiving roller 191 and the smoothing roller 195 are reliably smoothed out toward the width-direction outer sides in the above-described way, the paper sheets 1 are fed onto the guide surface 153a of the guide table 153 via the guide surface 152a of the guide table 152 by the lower variable-speed transport belt 159, and are further fed to a position between the first laminate rollers 41a and 41b of the laminate unit 40 while being held by the holding roller 102.

As described above, a plurality of the suction ports 153b are formed in the third guide table 153 in a way that each set of a plurality of suction ports 153b are aligned in the transport direction of the paper sheets 1, and the suction ports 153b of each set from the upstream side to the downstream side in the transport direction of the paper sheets 1 are arranged to be serially positioned from the inner side toward the outer side in the width directions of the third guide table 153. Accordingly, the paper sheets 1 are sucked so as to be pulled toward width-direction outer sides, and are thus smoothed out toward the width-direction outer sides.

Then, the paper sheets 1 fed to a position between the first laminate rollers 41a and 41b and overlapping imbricately are continuously laminated by feeding the film 2 held by the feed shaft 44 into a position between the first laminate rollers 41a and 41b as described above. The laminated paper sheets 1 are fed to a position between the feeding rollers 43a and 43b after being pressed by the second laminate rollers 42a and 42b, and are then continuously delivered from the position between the feeding rollers 43a and 43b together with the film 2.

In order to cut the film 2 in the width directions as described above, the blade 51a of the cutting mechanism 51 of the cutting unit 50 is inserted into a position between the transport-direction trailing end side of the lower surface of the preceding paper sheet 1 and the transport-direction leading end side of the upper surface of the subsequent paper sheet 1 of the paper sheets 1 continuously delivered together with the film 2 from the position between the feeding rollers 43a and 43b. Thereby, the film 2 continuously laminating the paper sheets 1 is cut for each of the paper sheets 1 (for more details, see Patent Document 2 and the like described above, for example).

The paper sheets 1 with the web-like film 2 cut for each of the paper sheets 1 are transported by the transport mechanism 61 of the separation unit 60 to be fed to a position between the acceleration rollers 62a and 62b. The paper sheets 1 are then delivered through the acceleration rollers 62a and 62b at a speed faster than the transport speed of the transport mechanism 61, and are thereby delivered separately one by one with a space between the preceding paper sheet 1 and the subsequent paper sheet 1. Thereafter, the paper sheets 1 are fed one by one to the transport mechanism 71 of the delivery unit 70 through the guide member 63, and are then separately delivered onto the delivery board 73 by the delivery cam 72.

By repeating the above-described operations, the paper sheets 1 can be first printed with ink, and then laminated with the film 2, in a consecutive manner.

In short, in this embodiment, the overlap unit 100 causes a relative difference between the transport speeds of the preceding paper sheet 1 and the subsequent paper sheet 1 from the printing unit 20, to feed, to the laminate unit 40, the preceding paper sheet 1 and the subsequent paper sheet 1 transported while having a space from each other, in such a manner that the transport-direction trailing end side of the lower surface of the preceding paper sheet 1 and the transport-direction leading end side of the upper surface of the subsequent paper sheet 1 can overlap each other.

According to this embodiment, it is possible to speedily perform printing on the paper sheets 1 by passing the paper sheets 1 once (in line) and then perform lamination on the paper sheets 1 with the film 2, in a small space. In addition, the following effects can also be obtained.

(1) The radius of the cylinder body 111 of the overlap cylinder 110 of the overlap unit 100 is set to be smaller than that of the transfer cylinder 101. Accordingly, the overlap cylinder 110 can be rotated at a slower peripheral speed than that of the transfer cylinder 101, and the transport speed of the paper sheets 1 can thereby be decreased before the transport of the paper sheets 1 reaches the infeed rollers 181 and 182. With this configuration, the time for allowing the transport speed of the paper sheets 1 by the infeed rollers 181 and 182 to change can be set long. Thus, even a situation in which the vertical-direction length of the paper sheets 1 is extremely small, or in which the vertical-direction overlap amount (overlap margin) is extremely large, can be addressed, so that the paper sheets 1 can overlap each other without any decrease in printing speed, and so that the lamination of the paper sheets 1 with the film 2 can be reliably performed without any decrease in processing capacity.

(2) The paper sheets 1 are each first held by the outfeed wheels 121 and the overlap cylinder 110 of the overlap unit 100, and the hold of the paper sheet 1 by the fingers 114 and the finger pads 115 is then released. Accordingly, a state in which the paper sheet 1 is not held around the overlap cylinder 110 is avoided, so that the paper sheet 1 can be transported without being out of alignment. In addition, a stable overlap amount (overlap margin) without variation can be obtained accurately. Furthermore, the paper sheets 1 can be caused to overlap each other while being aligned in the width directions (horizontal directions).

(3) The paper sheet 1 is first held by the infeed rollers 181 and 182 of the overlap unit 100, and is released from the state of being held between the outfeed wheels 121 and the overlap cylinder 110. In other words, the configuration is made to have a period in which the paper sheet 1 is transferred while being held between the infeed rollers 181 and 182 as well as between the outfeed wheels 121 and the overlap cylinder 110 concurrently. Accordingly, a state in which the paper sheet 1 is not held by any of the infeed rollers 181 and 182, as well as the outfeed wheels 121 and the overlap cylinder 110 can be avoided. Consequently, the paper sheet 1 can be transferred to a position between the infeed rollers 181 and 182 without being out of alignment. Hence, a stable overlap amount (overlap margin) without variation can be obtained accurately. In addition, the paper sheets 1 can be caused to overlap each other while being aligned in the width directions (horizontal directions).

(4) The cutout portion 121c is formed in the end surface between the rotation-direction downstream side of the large-diameter peripheral surface 121a and the rotation-direction upstream side of the small-diameter peripheral surface 121b of each of the outfeed wheels 121 of the overlap unit 100. Consequently, the transport-direction trailing end side of the preceding paper sheet 1, the transport speed of which is reduced by the infeed rollers 181 and 182, is prevented from interfering with the outfeed wheels 121. Thus, occurrence of damaged paper sheets can be prevented.

(5) In the suction guides 131 of the overlap unit 100, the suction ports 131b are set to suck the paper sheet 1, so that the transport-direction trailing end side of the paper sheet 1 can be moved in a direction orthogonal to the transport direction, in other words, moved so as to be away from the overlap cylinder 110 outward in the radial direction of the overlap cylinder 110. Accordingly, when the subsequent paper sheet 1 is delivered from the overlap cylinder 110, the collision of the subsequent paper sheet 1 with the preceding paper sheet 1 can be avoided. Hence, occurrence of waste paper sheets such as a paper sheet with a scratch mark on the printing surface can be prevented. In addition, the subsequent paper sheet 1 can be delivered below the preceding paper sheet 1, which enables these paper sheets 1 to overlap each other certainly.

(6) Air is set to be injected from the injection ports 116a of the injector 116 of the overlap cylinder 110 of the overlap unit 100. Accordingly, the transport-direction trailing end side of the paper sheet 1 is blown up toward the suction guide 131 side to be moved in a direction orthogonal to a plane along the transport direction, that is, moved so as to be away from the overlap cylinder 110 outward in the radial direction of the overlap cylinder 110. Hence, the transport-direction trailing end side of the paper sheet 1 is prevented from returning to the peripheral surface of the overlap cylinder 110, and the preceding paper sheet 1 and the subsequent paper sheet 1 can thus overlap each other certainly. In addition, the transport-direction trailing end side of the paper sheet 1 can be sucked to adhere to the guide surfaces 131a of the suction guides 131, for certain.

(7) The lift-up portions 113a protruding outward in the radial direction of the overlap cylinder 110 are provided respectively to the finger holders 113 of the overlap cylinder 110 of the overlap unit 100. Accordingly, the transport-direction trailing end side of the paper sheet 1 can be supported so as to have a space between the transport-direction trailing end side of the preceding paper sheet 1 and the peripheral surface of the cylinder body 111, the transport-direction trailing end side of the preceding paper sheet 1 positioned outward in the radial direction of the cylinder body 111. Hence, the transport-direction trailing end side of the paper sheet 1 can be certainly separated from the peripheral surface of the overlap cylinder 110 in a direction orthogonal to a plane along the transport direction. Moreover, when the hold of the subsequent paper sheet 1 by the fingers 114 and the finger pads 115 of the overlap cylinder 110 is released, the transport-direction trailing end side of the preceding paper sheet 1 can be lifted up so as to be further away from the overlap cylinder 110 in the direction orthogonal to a plane along the transport direction of the paper sheet 1. Thereby, a space can be certainly formed between the peripheral surface of the overlap cylinder 110 and the preceding paper sheet 1. Thus, the preceding paper sheet 1 and the subsequent paper sheet 1 can be caused to overlap each other certainly. In addition, the transport-direction trailing end side of the paper sheet 1 can be sucked to adhere to the guide surfaces 131a of the suction guides 131, for certain.

(8) In the first guide table 151 or the third guide table 153, each set of a plurality of suction ports 151b or 153b are aligned in the transport direction of the paper sheets 1, and the suction ports 151b or 153b of each set from the upstream side to the downstream side in the transport direction of the paper sheets 1 are arranged to be serially positioned from the inner side toward the outer side in the width directions of the first guide table 151 or the third guide table 153. Accordingly, the paper sheet 1 can be sucked so as to be pulled toward the width-direction outer sides, and the paper sheet 1 can thereby be smoothed out toward the width-direction outer sides. Hence, the laminate film 2 can be caused to closely adhere to entire surface of the paper sheet 1 evenly. Hence, the paper sheet 1 can be subjected to high-quality lamination.

(9) The paper sheet 1 is smoothed out by pressing the smoothing roller 195 against the receiving rollers 191, the smoothing roller 195 made of a flexible material and including the plurality of inclined grooves 195b, each of which is a groove inclining toward the axial-direction central side in the radial direction from the peripheral surface to the center, and which are formed at predetermined intervals along the axial directions of the smoothing roller 195, in order to be able to bend toward the axial-direction outer sides. Accordingly, the transported paper sheet 1 can be certainly smoothed out toward the width-direction outer sides. In addition, the lamination of the film 2 can adhere to the entire surface of the paper sheet evenly. Hence, the paper sheet 1 can be subjected to high-quality lamination.

Other Embodiments

In the above-described embodiment, the overlap cylinder 110 and the outfeed wheels 121 are set to rotate at a slower peripheral speed than that of the transfer cylinder 101 by using the overlap cylinder 110 with a smaller radius than that of the transfer cylinder 101. However, in another embodiment, it is also possible to use an overlap cylinder with the same radius as that of the transfer cylinder 101 so as to set the overlap cylinder and the outfeed wheels to rotate at the same peripheral speed as that of the transfer cylinder 101, for example.

In the above-described embodiment, the paper sheet 1 is held by the outfeed wheels 121 in cooperation with the peripheral surface of the cylinder body 111 of the overlap cylinder 110. However, in another embodiment, the paper sheet may be held by the outfeed wheels 121 in cooperation with the lower constant-speed belts 157 stretched around the cylinder body 111 of the overlap cylinder 110, instead, for example.

In the above-described embodiment, the speeds of the receiving rollers 191, the laminate rollers 41a, 41b, 42a, 42b and feeding rollers 43a, 43b of the laminate unit 40, the cutting mechanism 51 of the cutting unit 50, the transport mechanism 61 of the separation unit 60, and the like are changed in the same manner as the speed change of the downstream-side transport means such as the infeed rollers 181 and 182 and the variable-speed transport belts 158 and 159. However, in another embodiment, a configuration can be made such that at least the speeds of the receiving rollers 191, the laminate rollers 41a, 41b, 42a, 42b and feeding rollers 43a, 43b of the laminate unit 40 and the cutting mechanism 51 of the cutting unit 50 would be changed in the same manner as the speed change of the downstream-side transport means such as the infeed rollers 181 and 182 and the variable-speed transport belts 158 and 159. With this configuration, even when the speed of the transport mechanism 61 of the separation unit 60 is set at a constant speed so as not to change, it is possible to perform lamination of the film 2 on the paper sheets 1 without destroying the state of the paper sheets 1 overlapping each other, and to then cut the film 2 for each of the paper sheets 1 certainly.

In the above-described embodiment, the paper sheet 1 transferred from the printing unit 20 via the drying unit 30 is fed to a position between the infeed rollers 181 and 182 by the overlap cylinder 110 and the outfeed wheels 121 via the transfer cylinder 101 of the overlap unit 100. In another embodiment, however, the upstream-side transport means in the overlap means can be included in the printing means, the drying means or the like, for example. Specifically, the transfer cylinder 101 of the overlap unit 100 may be omitted, so that the paper sheet 1 transferred from the printing unit 20 via the drying unit 30 is fed directly to a position between the overlap cylinder 110 and the outfeed wheels 121 of the overlap unit 100. Alternatively, the overlap cylinder 110 and the outfeed wheels 121 of the overlap unit 100 may be omitted, so that the paper sheet 1 transferred from the printing unit 20 via the drying unit 30 is fed directly to a position between the infeed rollers 181 and 182 of the overlap unit 100.

It is nevertheless preferable that the paper sheet 1 transferred from the printing unit 20 via the drying unit 30 is fed to a position between the infeed rollers 181 and 182 by the overlap cylinder 110 and the outfeed wheels 121 via the transfer cylinder 101 of the overlap unit 100 as in the main embodiment, because this configuration enables the paper sheet 1 to be transferred, and to be fed to a position between the infeed rollers 181 and 182, without causing the paper sheet 1 to be out of alignment, as described above.

Moreover, in the above-described embodiment, the finger holders 113 of the overlap cylinder 110 of the overlap unit 100 are provided respectively with the lift-up portions 113a protruding outward in the radial direction of the overlap cylinder 110. However, in another embodiment, the lift-up portions 113a may be omitted, in other words, general finger holders may be used instead, for example. In such a case, it is not possible to support the transport-direction trailing end side of the preceding paper sheet 1, the transport-direction trailing end side located outward in the radial direction of the cylinder body 111, so as to provide a space between the transport-direction trailing end side of the paper sheet 1 and the peripheral surface of the cylinder body 111, when the fingers 114 of the overlap cylinder 110 are in a closed state. Nevertheless, when the hold of the subsequent paper sheet 1 by the fingers 114 and the finger pads 115 of the overlap cylinder 110 is released, the rotation of the fingers 114 being outward in the radial direction of the cylinder body 110 can cause the transport-direction trailing end side of the preceding paper sheet 1 to be lifted up, although to a small extent, so as to be away from the overlap cylinder 110 in a direction orthogonal to a plane along the transport direction of the paper sheet 1.

INDUSTRIAL APPLICABILITY

Hence, since the sheet-fed offset printing press according to the present invention is capable of applying in-line printing and lamination on a sheet, the use of the sheet-fed offset printing press according to the present invention can be beneficial to the printing industry.

The invention claimed is:
1. A sheet-fed offset printing press comprising:
   printing means for printing on sheets;
   laminate means for applying lamination to the sheets printed by the printing means, the laminate means being provided downstream of the printing means in a transport direction of the sheets,
   wherein the laminate means laminates the sheets caused to overlap each other by the overlap means, with a web-like film;
   overlap means provided between the printing means and the laminate means, and for feeding, to the laminate means, the sheets printed by the printing means, after causing a transport-direction trailing end side of the preceding sheet and a transport-direction leading end side of the subsequent sheet to overlap each other,
   wherein the overlap means causes the transport-direction trailing end side of the preceding sheet and the transport-direction leading end side of the subsequent sheet to overlap each other by making a relative difference between transport speeds of the preceding sheet and the subsequent sheet; and cutting means for cutting the film, with which the sheets are laminated, for each of the sheets, the cutting means provided downstream of the laminate means in the transport direction of the sheets.

2. The sheet-fed offset printing press according to claim 1, wherein the overlap means causes a surface of the preceding sheet and a surface of the subsequent sheet to overlap each other, the surface of the preceding sheet being opposite to a surface to be laminated of the preceding sheet, and the surface of the subsequent sheet being the surface to be laminated.

3. The sheet-fed offset printing press according to claim 1, wherein the overlap means causes the transport-direction trailing end side of the preceding sheet and the transport-direction leading end side of the subsequent sheet to overlap each other by making the transport speed of the preceding sheet slower than that of the subsequent sheet.

4. The sheet-fed offset printing press according to claim 3, wherein the overlap means includes:
  upstream-side transport means for transporting the sheets printed by printing means; and
  downstream-side transport means for receiving the sheets from the upstream-side transport means, and then transporting the sheets to the laminate means at a transport speed while changing the transport speed, the transport speed being equal to or slower than that at which the upstream-side transport means transports the sheets.

5. The sheet-fed offset printing press according to claim 4, wherein
  the upstream-side transport means includes upstream-side hold transport means for transporting the sheets while holding the sheets, and
  the downstream-side transport means includes downstream-side hold transport means for transporting the sheets while holding the sheets.

6. The sheet-fed offset printing press according to claim 4, wherein the downstream-side transport means of the overlap means and the laminate means transport the sheets at the same transport speed.

7. The sheet-fed offset printing press according to claim 4, wherein the downstream-side transport means repeats such a speed change cycle that, after decreasing from the same transport speed as that at which the upstream-side transport means transports the sheets, the transport speed at which the downstream-side transport means transports the sheets increases so as to return to the same transport speed as that at which the upstream-side transport means transports the sheets.

8. The sheet-fed offset printing press according to claim 7, wherein the downstream-side transport means is capable of changing a rate of change in transport speed of the sheets.

9. The sheet-fed offset printing press according to claim 4, wherein a transfer period is set in which the downstream-side transport means and the upstream-side transport means concurrently transport the same one of the sheets.

10. The sheet-fed offset printing press according to claim 9, wherein the downstream-side transport means transports the sheets at the same transport speed as that at which the upstream-side transport means transports the sheets, in the transfer period, then decreases the transport speed from the same transport speed as that at which the upstream-side transport means transports the sheets, when the transfer period is completed, and thereafter increases the transport speed so as to return to the same transport speed as that at which the upstream-side transport means transports the sheets.

11. The sheet-fed offset printing press according to claim 1, further comprising control means that controls the overlap means so that an overlap margin of the transport-direction trailing end side of the preceding sheet and the transport-direction leading end side of the subsequent sheet has a predetermined length in the transport direction.

12. The sheet-fed offset printing press according to claim 11, further comprising:
  sheet length setting means for setting the transport-direction length of the sheets; and
  overlap-margin setting means for setting the overlap margin,
  wherein the control means adjusts the relative difference between the transport speeds of the preceding sheet and the subsequent sheet on the basis of information from each of the sheet length setting means and the overlap-margin setting means, and thereby controls the overlap means to make the overlap margin equal to that set by the overlap-margin setting means.

13. The sheet-fed offset printing press according to claim 12, wherein
  the overlap means includes:
    upstream-side transport means for transporting the sheets printed by the printing means; and
    downstream-side transport means for receiving the sheets from the upstream-side transport means, and then transporting the sheets to the laminate means, and,
  the control means controls the transport speeds at which the downstream-side transport means transports the sheets.

14. The sheet-fed offset printing press according to claim 1, further comprising separation means for transporting the preceding sheet so that the preceding sheet with its laminate material cut is separated from the subsequent sheet by transporting the preceding sheet at speed faster than the subsequent sheet, the separation means being provided downstream of the cutting means in the transport direction of the sheets.

15. The sheet-fed offset printing press according to claim 14, wherein the separation means transports the preceding sheet at a speed faster than transport speed of the sheet transported by the printing means.

16. The sheet-fed offset printing press according to claim 1, further comprising a guide table guiding the sheets caused to overlap each other by the overlap means, to the laminate means.

17. The sheet-fed offset printing press according to claim 1, further comprising smoothing means for smoothing out the sheets caused to overlap each other by the overlap means, in the width directions.

18. The sheet-fed offset printing press according to claim 17, wherein the smoothing means includes a smoothing roller: rotationally supported to have the axial directions in the width directions of the sheets; having at least a peripheral surface made of a flexible material; and including a plurality of bending portions each extending from an axial-direction central side to axial-direction outer sides, and formed at predetermined intervals along the axial directions, so as to be able to bend toward the axial-direction outer sides when the sheets are pressed against the smoothing roller.

* * * * *